United States Patent
Fajt et al.

(10) Patent No.: US 11,146,661 B2
(45) Date of Patent: Oct. 12, 2021

(54) SYSTEMS AND METHODS FOR DETECTING COLLABORATIVE VIRTUAL GESTURES

(71) Applicant: Rec Room Inc.

(72) Inventors: Nicholas Fajt, Seattle, WA (US);
Cameron Brown, Seattle, WA (US);
Dan Kroymann, Seattle, WA (US);
Omer Bilal Orhan, Seattle, WA (US);
Johnathan Bevis, Seattle, WA (US);
Joshua Wehrly, Seattle, WA (US)

(73) Assignee: Rec Room Inc., Seattle, WA (US)

( * ) Notice: Subject to any disclaimer, the term of this patent is extended or adjusted under 35 U.S.C. 154(b) by 29 days.

(21) Appl. No.: 16/313,829

(22) PCT Filed: Jun. 28, 2017

(86) PCT No.: PCT/US2017/039826
§ 371 (c)(1),
(2) Date: Dec. 27, 2018

(87) PCT Pub. No.: WO2018/005692
PCT Pub. Date: Jan. 4, 2018

(65) Prior Publication Data
US 2019/0379765 A1    Dec. 12, 2019

Related U.S. Application Data

(60) Provisional application No. 62/355,802, filed on Jun. 28, 2016, provisional application No. 62/379,479, filed on Aug. 25, 2016.

(51) Int. Cl.
*H04L 29/06*     (2006.01)
*A63F 13/428*    (2014.01)
(Continued)

(52) U.S. Cl.
CPC ............ *H04L 67/38* (2013.01); *A63F 13/428* (2014.09); *A63F 13/55* (2014.09); *G06F 3/011* (2013.01); *G06F 3/017* (2013.01); *H04L 67/22* (2013.01)

(58) Field of Classification Search
CPC ......... G06F 3/011; G06F 3/017; A63F 13/795
See application file for complete search history.

(56) References Cited

U.S. PATENT DOCUMENTS 7,725,547 B2 *  5/2010  Albertson ............... G06F 3/016
                                                              382/107
8,332,755 B2   12/2012  Zhang et al.
(Continued)

FOREIGN PATENT DOCUMENTS

RU           2 530 708 C2    10/2014

OTHER PUBLICATIONS

International Search Report and Written Opinion dated Sep. 14, 2017, issued in corresponding International Application No. PCT/US2017/039826, filed Jun. 28, 2017, 8 pages.
(Continued)

*Primary Examiner* — Jennifer N To
*Assistant Examiner* — Qi Wan
(74) *Attorney, Agent, or Firm* — Christensen O'Connor Johnson Kindness PLLC

(57) ABSTRACT

An endpoint system including one or more computing devices receives user input associated with an avatar in a shared virtual environment; calculates, based on the user input, motion for a portion of the first avatar, such as a hand; determines, based on the user input, a first gesture state for first avatar; transmits first location change notifications and a representation of the first gesture state for the first avatar; receives second location change notifications and a representation of a second gesture state for a second avatar;
(Continued)

detects a collision between the first avatar and the second avatar based on the first location change notifications and the second location change notifications; and identifies a collaborative gesture based on the detected collision, the first gesture state, and the second gesture state.

20 Claims, 14 Drawing Sheets

(51) Int. Cl.
*A63F 13/55* (2014.01)
*G06F 3/01* (2006.01)
*H04L 29/08* (2006.01)

(56) References Cited

U.S. PATENT DOCUMENTS

| | | | |
|---|---|---|---|
| 9,015,638 B2 | 4/2015 | Kipman et al. | |
| 9,223,399 B2* | 12/2015 | Bokor | G06F 3/011 |
| 9,244,533 B2 | 1/2016 | Friend et al. | |
| 9,292,092 B2 | 3/2016 | Yuxin et al. | |
| 2003/0217297 A1* | 11/2003 | Gschwind | G06F 1/206 |
| | | | 713/300 |
| 2007/0005692 A1* | 1/2007 | Gist | H04L 63/08 |
| | | | 709/204 |
| 2007/0296696 A1* | 12/2007 | Nurmi | G06F 3/017 |
| | | | 345/158 |
| 2009/0063991 A1* | 3/2009 | Baron | G06Q 10/10 |
| | | | 715/751 |
| 2010/0277411 A1* | 11/2010 | Yee | G06F 3/017 |
| | | | 345/156 |
| 2011/0154266 A1 | 6/2011 | Friend et al. | |
| 2011/0289456 A1 | 11/2011 | Reville et al. | |
| 2013/0198861 A1* | 8/2013 | Kishi | G06F 21/445 |
| | | | 726/28 |
| 2014/0043234 A1 | 2/2014 | Eilat et al. | |
| 2014/0184496 A1 | 7/2014 | Gribetz et al. | |
| 2014/0218467 A1* | 8/2014 | You | H04N 7/144 |
| | | | 348/14.16 |
| 2014/0344408 A1* | 11/2014 | Buban | G06F 3/011 |
| | | | 709/217 |
| 2015/0127541 A1 | 5/2015 | Just et al. | |
| 2016/0055672 A1 | 2/2016 | Lundin et al. | |
| 2016/0093108 A1* | 3/2016 | Mao | A63F 13/795 |
| | | | 345/633 |
| 2017/0109936 A1 | 4/2017 | Powderly et al. | |
| 2017/0297618 A1* | 10/2017 | Shah | B62D 6/00 |

OTHER PUBLICATIONS

Jones, B., "Positive Social Interaction is a Priority for Google's VR Projects," Aug. 13, 2016 <https://www.digitaltrends.com/virtual-reality/google-promotes-positive-interactions-vr/> [retrieved Jun. 18, 2017], 3 pages.

Marshall, J., and P. Tennent, "Touchomatic: Interpersonal Touch Gaming in the Wild," Proceedings of the 2017 Conference on Designing Interactive Systems (DIS '17), Jun. 10-14, 2017, Edinburgh, pp. 417-428.

Vaddi, D., et al., "Investigating the Impact of Cooperative Communication Mechanics on Player Performance in Portal 2," Proceedings of the 42nd Graphics Interface Conference (GI '16), Jun. 1-3, 2016, Victoria, B.C., Canada, pp. 41-48.

"Virtual Reality Will Change the Way We Conference," Doghead Simulations, Mar. 2, 2017, <http://www.dogheadsimulations.com/doghead-blog/2017/3/1/how-virtual-reality-will-change-the-way-we-conference> [retrieved Jun. 18, 2017], 6 pages.

* cited by examiner

SYSTEMS AND METHODS FOR DETECTING COLLABORATIVE VIRTUAL GESTURES

CROSS-REFERENCE(S) TO RELATED APPLICATION(S)

The present application claims the benefit of Provisional Application No. 62/355,788, filed Jun. 28, 2016, the entire disclosure of which is hereby incorporated by reference herein for all purposes.

The present application is related to International Patent Application No. PCT/US2017/039799, filed Jun. 28, 2017, entitled SYSTEMS AND METHODS FOR TRANSFERRING OBJECT AUTHORITY IN A SHARED VIRTUAL ENVIRONMENT; International Patent Application No. PCT/US2017/039800, filed Jun. 28, 2017, entitled SYSTEMS AND METHOD FOR MANAGING PERMISSION FOR INTERACTING WITH VIRTUAL OBJECTS BASED ON VIRTUAL PROXIMITY; International Patent Application No. PCT/US2017/039801, filed Jun. 28, 2017, entitled SYSTEMS AND METHODS PROVIDING TEMPORARY DECOUPLING OF USER AVATAR SYNCHRONICITY FOR PRESENCE ENHANCING EXPERIENCES; and International Patent Application No. PCT/US2017/039824 filed Jun. 28, 2017, entitled SYSTEMS AND METHODS FOR ASSISTING VIRTUAL GESTURES BASED ON VIEWING FRUSTUM, the entire disclosures of which are hereby incorporated by reference herein for all purposes.

BACKGROUND

Virtual environments such as virtual reality environments, augmented reality environments, and the like, are growing in popularity. Virtual environments provide highly desirable platforms for interactions between users, including highly complex social and group interactions. However, there are significant technical problems to be overcome for such interactions to carry technical meaning in a virtual environment. For example, a system that manages the virtual environment will not able to determine based on personal experience whether a particular group behavior has been successfully completed, as a human could do. Instead, motions and orientations of avatars must be formally described and tracked.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In described embodiments, an endpoint system including one or more computing devices identifies collaborative gestures in a shared virtual environment based on gesture states as well as collisions or proximity between avatars. For example, the endpoint system receives user input associated with an avatar in a shared virtual environment; calculates, based on the user input, motion for a portion of the first avatar, such as a hand; determines, based on the user input, a first gesture state for first avatar; transmits first location change notifications and a representation of the first gesture state for the first avatar; receives second location change notifications and a representation of a second gesture state for a second avatar; detects a collision between the first avatar and the second avatar based on the first location change notifications and the second location change notifications; and identifies a collaborative gesture based on the detected collision, the first gesture state, and the second gesture state.

In one aspect, a first endpoint system receives first user input associated with a hand of a first avatar in a shared virtual environment; calculates, based on the first user input, first motion for the hand of the first avatar; determines, based on the first user input, a first gesture state for the hand of the first avatar; transmits first location change notifications and a representation of the first gesture state for the hand of the first avatar; receives second location change notifications and a representation of a second gesture state for a hand of a second avatar; detects a collision between the hand of the first avatar and the hand of the second avatar based on the first location change notifications and the second location change notifications; and identifies a collaborative gesture based on the detected collision, the first gesture state, and the second gesture state.

The first endpoint system may operate in combination with a second endpoint system that receives second user input associated with the hand of the second avatar in the shared virtual environment; calculates, based on the second user input, second motion for the hand of the second avatar; determines, based on the second user input, the second gesture state for the hand of the second avatar; transmits the second location change notifications for the hand of the first avatar and the representation of the second gesture state; receives the first location change notifications and a representation of the first gesture state for the hand of the first avatar; detects a collision between the hand of the first avatar and the hand of the second avatar based on the first location change notifications and the second location change notifications; and identifies a collaborative gesture based on the detected collision, the first gesture state, and the second gesture state. Identification of a collaborative gesture may be based on additional factors, such as whether the first avatar and the second avatar are facing each other in the shared virtual environment.

The gesture states may indicate a clenched grip, in which case the collaborative gesture may be a handshake gesture or a closed-fist gesture. The gesture states may indicate an open hand, in which case the collaborative gesture may be a high-five gesture.

In a handshake gesture, the first endpoint system may be further configured to present the hand of the second avatar as an object held by the hand of the first avatar, and the second endpoint system may be further configured to present the hand of the first avatar as an object held by the hand of the second avatar. In that situation, further location change notifications received by the first endpoint system for the hand of the second avatar may be ignored during the handshake gesture, and further location change notifications received by the second endpoint system for the hand of the first avatar may be ignored.

The endpoint systems may be further configured to cause execution of a function in response to identification of the collaborative gesture. The functions may include special visual or audio effects, or other functions. For example, if the collaborative gesture is a handshake gesture, the function may include establishing a relationship between a user associated with the first avatar and a user associated with the second avatar. If the collaborative gesture comprises a high-five gesture, the function may include a starting a game. The function may be executed by the endpoint systems or some other system.

The system may include a communication relay server to assist in the transmitting and receiving steps. For example, the communication relay server may be configured to determine one or more other endpoint systems to receive the location change notifications and gesture states; and transmit the location change notifications and gesture states to the one or more other endpoint systems.

The endpoint computing systems may include an endpoint computing device, a head-mounted display device communicatively coupled to the endpoint computing device; and at least one handheld controller device communicatively coupled to the endpoint computing device.

Corresponding methods and computer-readable media are also described.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
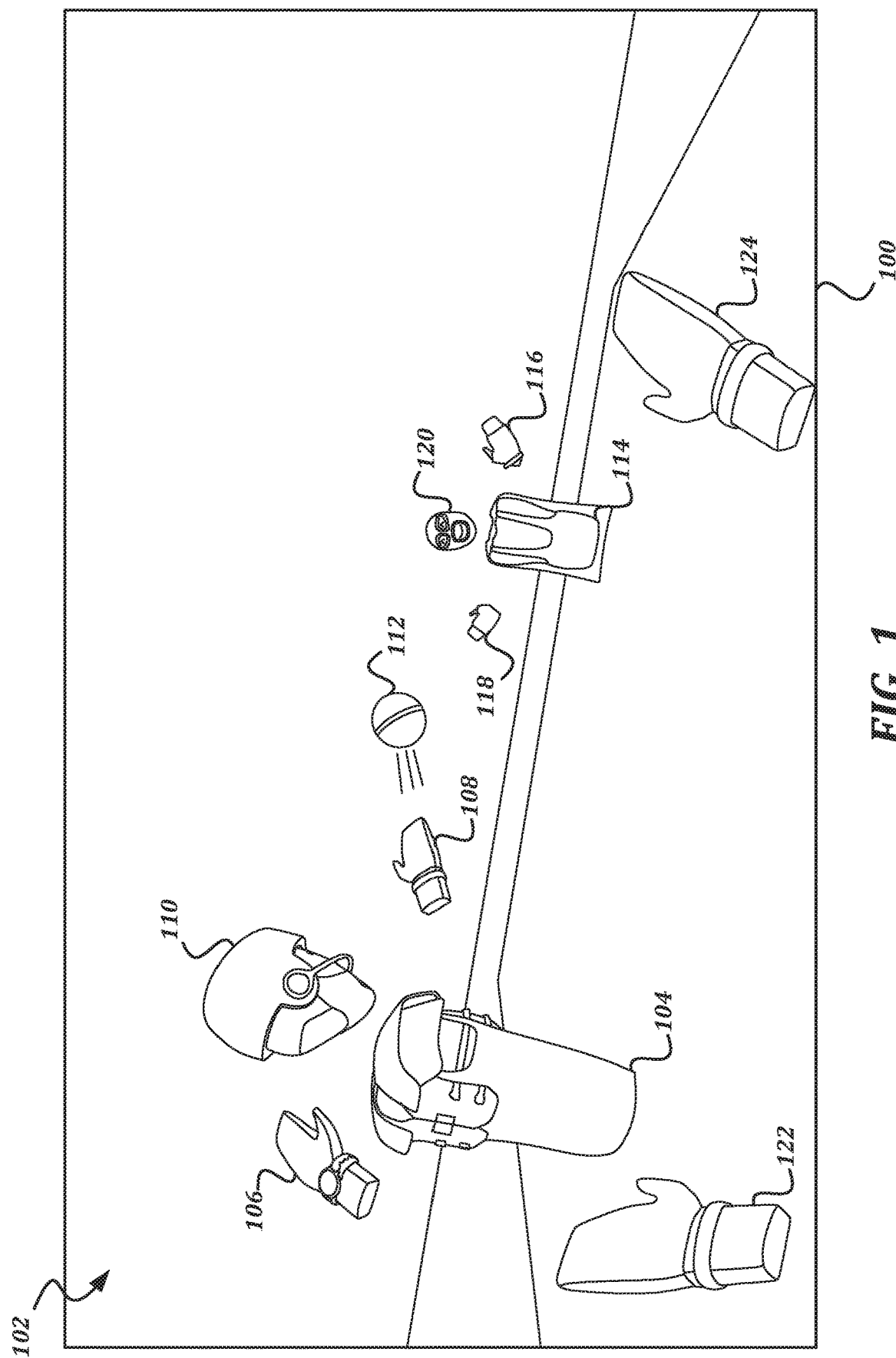
FIG. 1 is an illustration of an example embodiment of a shared virtual environment according to various aspects of the present disclosure.

Virtual environments such as virtual reality environments, augmented reality environments, and the like, are growing in popularity. Virtual environments provide highly desirable platforms for interactions between users, including highly complex social and group interactions. However, there are significant technical problems to be overcome for such interactions to carry technical meaning in a virtual environment. For example, a system that manages the virtual environment will not able to determine based on personal experience whether a particular group behavior has been successfully completed, as a human could do. Instead, motions and orientations of avatars must be formally described and tracked. In addition, unlike systems in which multiple people may be physically present together in the same room, a system in which interacting users may be remote from one another must provide sufficiently realistic modeling and notification techniques to allow for such gestures.

In some embodiments of the present disclosure, a system recognizes when multiple users connected to the same network-synchronized system are performing virtual gestures together in a collaborative way. The system may include a definition for each gesture that is programmed into the simulation that can be tested against to identify collaborative gestures. These definitions take the form of a state or a series of states of users' avatars. The states are achieved based on input received from controllers (e.g., handheld controllers), head-mounted display devices, and the like. Each state may be defined by position or orientation of an avatar in space, and by proximity to or collision with a virtual object, such as the avatar of another user. Collaborative gestures may include handshakes, high-fives, first bumps, and the like.

For example, a collaborative gesture may be defined by a series of states that are moved through rapidly based on the geometry of the individual movements, such as the following:
{avatar hands of two users are not colliding};
{hands are colliding};
{hands are no longer colliding}.

In addition, a particular gesture state (e.g., a closed or open hand) for the colliding hands may be required to complete the gesture.

In some embodiments, after recognizing a collaborative gesture, an endpoint system can transmit a corresponding notification to other devices on the network (e.g., servers or other endpoint systems). In one illustrative scenario, when multiple users agree that they have performed a known gesture together, the gesture can be classified as a social or collaborative gesture and used to move the state of the simulation for themselves and potentially for other users in the VR environment. A successful collaborative gesture may cause a function to be performed, such as a visual effect or a sound effect to indicate that the collaborative gesture has been recognized. As possible applications of these techniques, a recognized collaborative gesture can be used to advance the state of a game (e.g., using a high five to start a game in the VR environment) or to establish a relationship with another user (e.g., using a handshake gesture to establish a "friend" relationship between users in the VR environment).

Further details of how such techniques may be implemented are provided below, following a description of an illustrative virtual environment and related devices that may be used in accordance with disclosed embodiments.

Illustrative Virtual Environment and Related Devices

The following section includes a description of an illustrative virtual environment and related devices that may be used in accordance with disclosed embodiments. The descriptions in this section provide only an illustrative context for an implementation environment for described embodiments; the details in this section are not required for all embodiments.

FIG. 1 is an illustration of an example embodiment of a shared virtual environment according to various aspects of the present disclosure. In FIG. 1, a display 100 of a head-mounted display device is illustrated, showing a view of a shared virtual environment 102 presented to a user via the head-mounted display device. The shared virtual environment 102 is a virtual room in which two or more users may interact with each other and/or with objects within the shared virtual environment through avatars. As shown, the view is a first-person view of the shared virtual environment 102, and two avatars can be seen. A first avatar has a head 110, a torso 104, a left hand 106 and a right hand 108. A second avatar also has a head 120, a left hand 116, a right hand 118, and a torso 114. In the illustrated scene, the first avatar has just thrown a ball 112 towards the second avatar. Because the scene is a first-person view, the user can also see a left hand 122 and a right hand 124 that correspond to the user's own avatar. This scene is an illustrative example to establish context for the rest of the disclosure, and should not be seen as limiting to any specific type of avatar, object, or virtual room.

Figure 2:
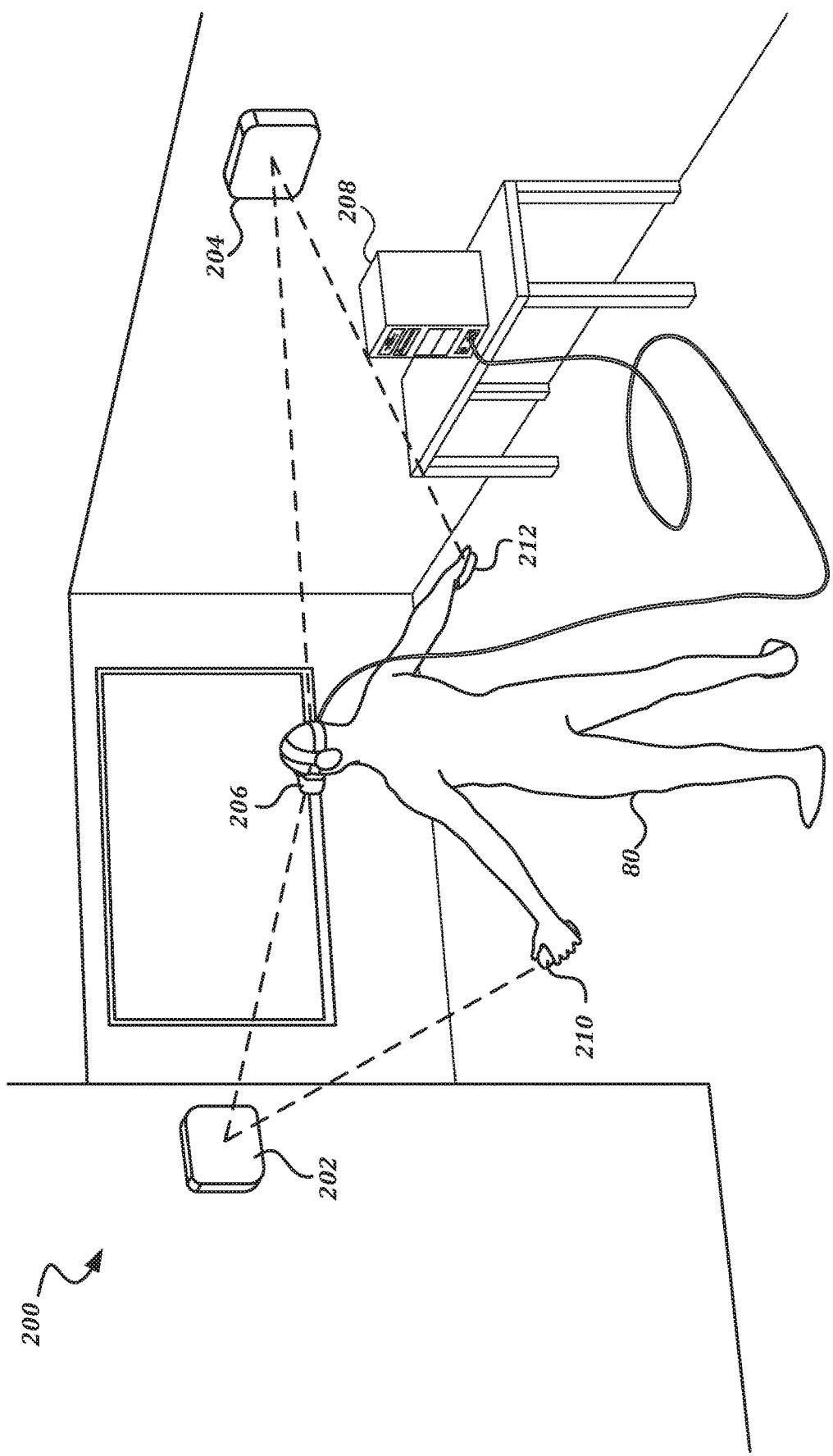
FIG. 2 is an illustration of a user interacting with an example embodiment of an endpoint system according to various aspects of the present disclosure.

Each avatar in the shared virtual environment is associated with an endpoint system. FIG. 2 is an illustration of a user interacting with an example embodiment of an endpoint system according to various aspects of the present disclosure. The user 80 is in a room 200 that has been configured with an endpoint system. An endpoint computing device 208 is connected to a head-mounted display device 206 worn by the user 80 via a cable. The user 80 holds a first handheld controller device 210 in one hand, and a second handheld controller device 212 in the other hand. One or more motion sensor devices 202, 204 are arranged around the room 200, and detect the position and/or motion of the head-mounted display device 206 and the handheld controller devices 210, 212 within the room 200. The endpoint computing device 208 may use the detected positions and/or motions of the handheld controller devices 210, 212 to control the hands of the avatar 122, 124 within the shared virtual environment 102. The endpoint computing device 208 may use the detected positions and/or motions of the head-mounted display device 206 to move the avatar associated with the endpoint system within the shared virtual environment 102, and to move the viewpoint rendered by the head-mounted display device 206 within the shared virtual environment 102. Further details regarding each of these components are provided below.

In order to provide the most immersive experience for users of the shared virtual environment, it is desirable to have the shared virtual environment mimic the real world as much as possible. For instance, it is desirable to make objects within the shared virtual environment move and behave as if they are governed by the rules of Newtonian physics. While physics simulations of virtual objects are common, the use of such simulations in a shared virtual environment is less common. In order to generate a traditional shared virtual environment, a central device would typically be used to simulate each of the virtual objects, and would transmit the state of the objects to endpoint systems for presentation. However, the latency involved in such transmissions can be disorienting and can diminish the immersiveness of the presentation. To improve the experience, embodiments of the present disclosure simulate objects within the shared virtual environment at the endpoint systems so that there is no latency. For a given object, the endpoint system that is interacting with the object is assigned object authority over that object, and generates the physical simulation of the object. That endpoint system then transmits notifications to other endpoint systems to share the state of the object.

Because the virtual environment is shared, objects can be transferred from one avatar to another. This means, for objects that can be transferred from one avatar to another (like a thrown ball, etc.), object authority will need to be transferred from a first endpoint system to a second endpoint system. Further, endpoint systems will need to be able to present objects for which they do not have object authority.

Figure 3:
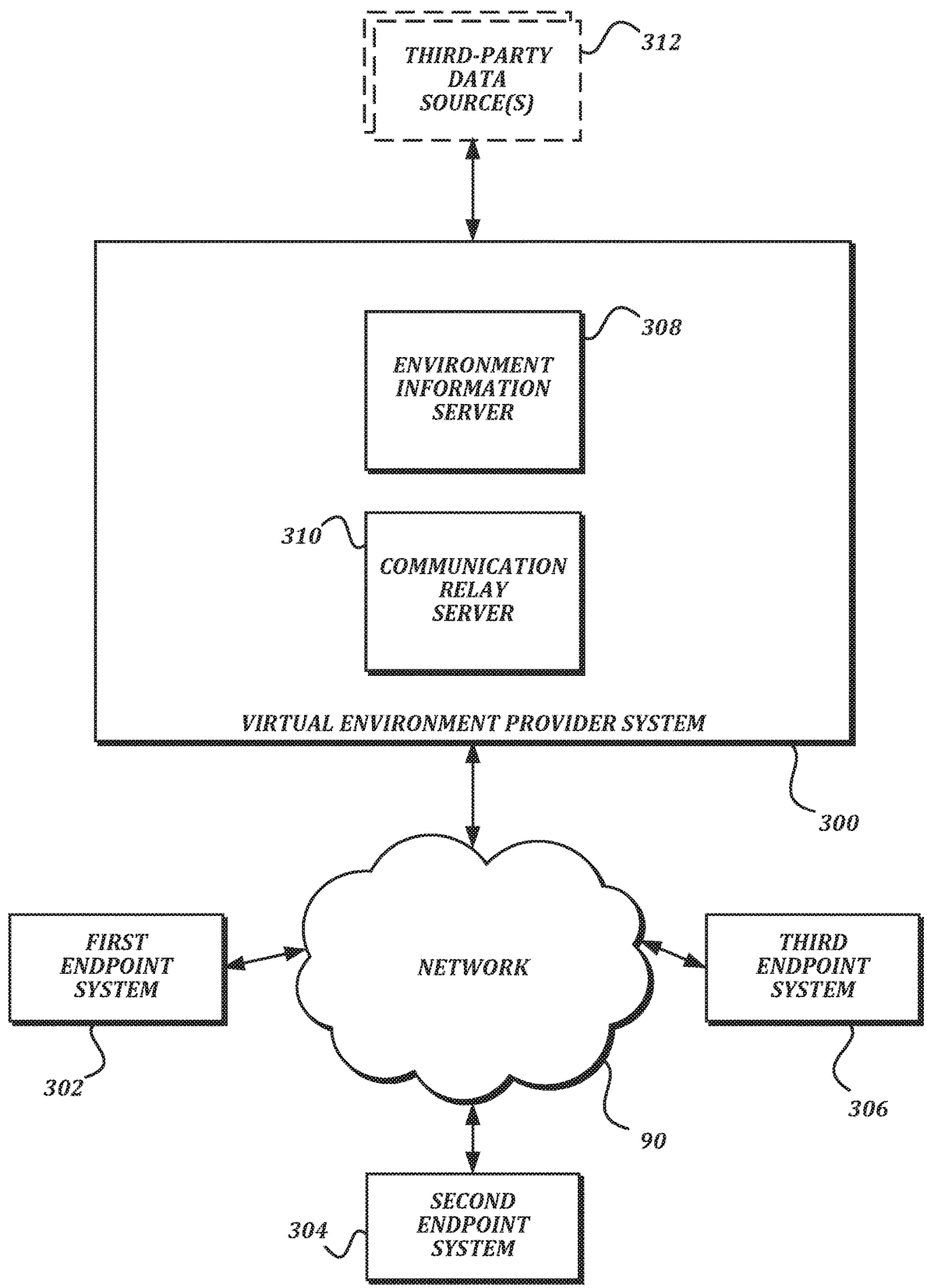
FIG. 3 is a block diagram that illustrates an example embodiment of a virtual environment provider system according to various aspects of the present disclosure.

FIG. 3 is a block diagram that illustrates an example embodiment of a virtual environment provider system according to various aspects of the present disclosure. In the illustrated embodiment, the virtual environment provider system 300 includes an environment information server 308 and a communication relay server 310.

In some embodiments, the environment information server 308 is primarily responsible for managing persistent information relating to providing the shared virtual environment. For example, the environment information server 308 may manage user account information, preferences, long-lived virtual object information, and/or other information. In some embodiments, the communication relay server 310 is primarily responsible for distributing notifications received from endpoint systems to other endpoint systems. The communication relay server 310 may also extract some data for temporary storage from the notifications that pass through it. Further description of the functionality provided by the environment information server 308 and the communication relay server 310 is provided below.

Each server of the virtual environment provider system 300 may be one or more computing devices. In some embodiments, the environment information server 308 and the communication relay server 310 may be merged to be provided by a single computing device. In some embodiments, the virtual environment provider system 300 may include a plurality of computing devices that interchangeably provide the functionality of both servers 308, 310. In some embodiments, the servers 308, 310 of the virtual environment provider system may be provided using a cloud computing service. In some embodiments, the virtual environment provider system 300 may be co-located with (or may be provided by) the same computing devices as one of the endpoint systems 302-306. In some embodiments, the virtual environment provider system 300 is remote from the endpoint systems 302-306.

In the illustrated embodiment, the virtual environment provider system 300 communicates with a plurality of endpoint systems, including a first endpoint system 302, a second endpoint system 304, and a third endpoint system 306 via a network 90. In some embodiments, there may be more or fewer than three endpoint systems communicating with each other and the virtual environment provider system 300, though three are illustrated herein in order to describe the functionality of the system. Connections via the network 90 may be implemented using any combination of suitable wired and/or wireless communication technology, including but not limited to Ethernet, fiber-optics, WiFi, 2G, 3G, LTE, WiMAX, and Bluetooth.

In the illustrated embodiment, the virtual environment provider system 300 may optionally communicate with one or more third-party data sources 312. Third-party data sources 312 may be run by different parties than the virtual environment provider system 300, and may be used to provide enhanced content within the virtual environment provider system 300. Some examples of third-party data sources 312 include, but are not limited to, social networking services, billing services, providers of third-party content such as virtual objects, and media providing services.

Figure 4A:
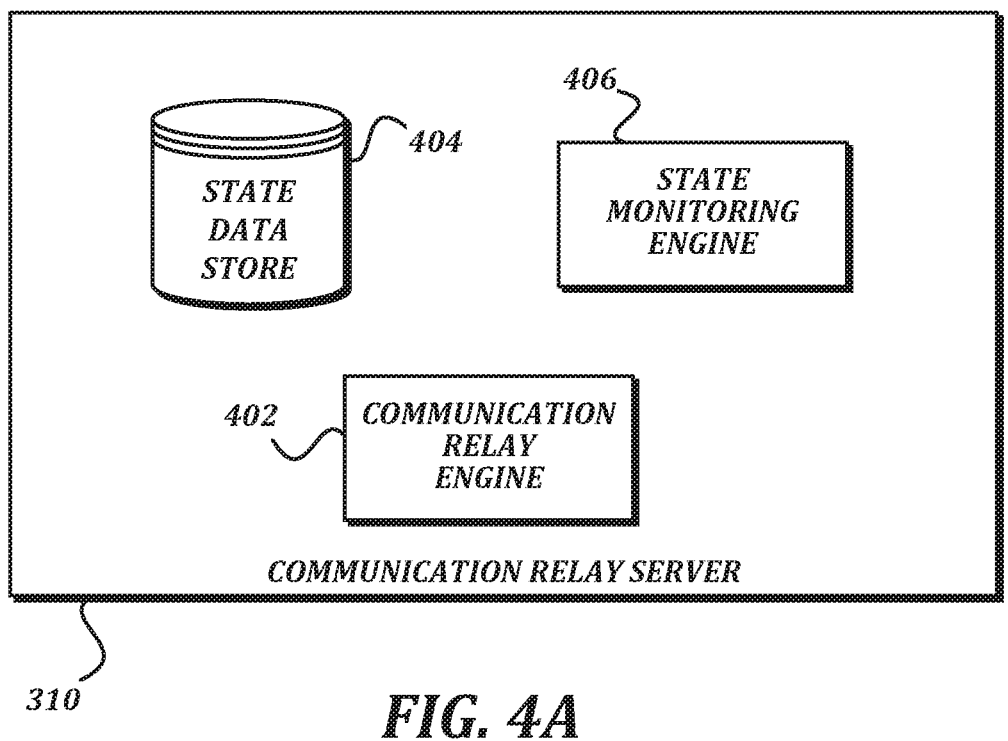
FIG. 4A is a block diagram that illustrates an example embodiment of a communication relay server according to various aspects of the present disclosure.

FIG. 4A is a block diagram that illustrates an example embodiment of a communication relay server according to various aspects of the present disclosure. Typically, bandwidth available to endpoint systems may be asymmetric. That is, a bandwidth available for upload may be significantly less than a bandwidth available for download. While this may not present a significant problem when a first endpoint system 302 and a second endpoint system 304 are the only endpoint systems, the problem arises as additional endpoint systems are added. If notifications were transmitted directly between endpoint systems (instead of via the communication relay server 310), a transmitting endpoint system would have to send an additional notification for each new endpoint system taking part in the shared virtual environment. Hence, as the number of objects for which notifications are transmitted from a first endpoint system 302 and the number of other endpoints both increase, the number of notifications that have to be transmitted by the first endpoint system 302 increases exponentially. This is likely to rapidly consume the available upload bandwidth. To solve this problem, the first endpoint system 302 can send a single notification to the communication relay server 310, and the communication relay server 310 sends it to the other endpoint systems. This helps conserve the limited upload bandwidth available to the first endpoint system 302. Further details of how this transmission may take place are provided below in FIG. 8 and the accompanying text.

In the illustrated embodiment, the communication relay server 310 includes a state monitoring engine 406, a communication relay engine 402, and a state data store 404.

In general, the word "engine," as used herein, refers to logic embodied in hardware and/or software instructions, which can be written in a programming language, such as C, C++, C#, COBOL, JAVA™, PHP, Perl, HTML, CSS, JavaScript, VBScript, ASPX, Microsoft .NET™, and/or the like. An engine may be compiled into executable programs or written in interpreted programming languages. Engines may be callable from other engines or from themselves. Generally, the engines described herein refer to logical components that can be merged with other engines, or can be divided into sub-engines. The engines can be stored in any type of computer-readable medium or computer storage device and be stored on and executed by one or more general purpose computers, thus creating a special purpose computer configured to provide the engine.

As understood by one of ordinary skill in the art, a "data store" as described herein may be any suitable device configured to store data for access by a computing device. One example of a data store is a key-value store. However, any other suitable storage technique and/or device capable of organizing and storing the data may be used, such as a relational database management system (RDBMS), an object database, and/or the like. Other examples of a data store may also include data stored in an organized manner on a computer-readable storage medium, as described further below.

One example of a data store which includes reliable storage, but also low overhead, is a file system or database management system that stores data in files (or records) on a computer-readable medium such as flash memory, random access memory (RAM), hard disk drives, and/or the like. Such a data store may be likely to be used locally by the endpoint computing device 502. One example of a data store is a highly reliable, high-speed RDBMS or key-value store executing on one or more computing devices and accessible over a high-speed packet switched network. Such data stores may be likely to be used by the virtual environment provider system 300. One of ordinary skill in the art will recognize that separate data stores described herein may be combined into a single data store, and/or a single data store described herein may be separated into multiple data stores, without departing from the scope of the present disclosure.

In some embodiments, the communication relay engine 402 is configured to receive notifications from endpoint systems, and to re-transmit those notifications to other endpoint systems. In some embodiments, the state monitoring engine 406 is configured to manage state information held within the state data store 404. In some embodiments, the state monitoring engine 406 may review the notifications received by the communication relay engine 402, and may store information from the notifications in the state data store 404. In some embodiments, the state monitoring engine 406 may ignore information that is ephemeral (including but not limited to location information from location change notifications associated with moving objects), because it will change too quickly to be usefully stored. In some embodiments, the state monitoring engine 406 may wait to store location information in the state data store 404 until the location change notifications indicate that a previously moving object has come to rest. In some embodiments, the state monitoring engine 406 may store information from notifications that is not ephemeral (or at least that changes on a less-frequent basis), such as whether an avatar is present in the shared virtual environment, a score for a game being played, and/or the like. Though each endpoint system should be receiving the notifications from the communication relay engine 402, storing data in the state data store 404 allows an endpoint system that joins the shared virtual environment later to receive initial status upon joining, instead of having to wait to receive notifications from the various endpoint systems to know what objects to present.

Figure 4B:
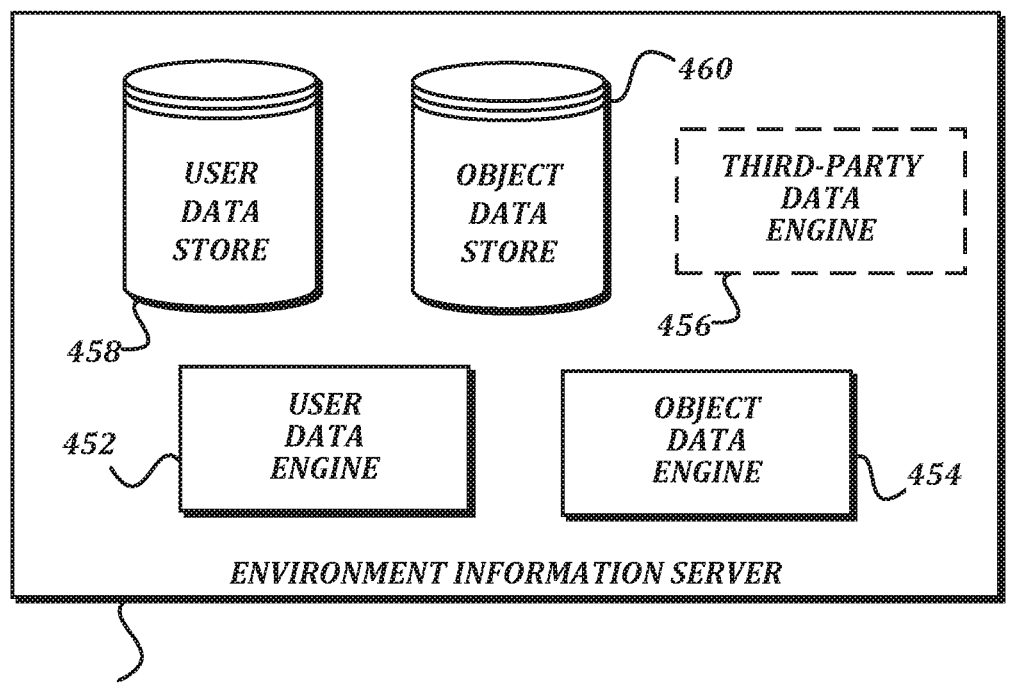
FIG. 4B is a block diagram that illustrates an example embodiment of an environment information server according to various aspects of the present disclosure.

FIG. 4B is a block diagram that illustrates an example embodiment of an environment information server according to various aspects of the present disclosure. In some embodiments, presenting the shared virtual environment will involve shared, immutable objects that can be altered by the environment provider but are otherwise static (such as walls, game logic, and/or the like). Presenting the shared virtual environment may also involve managing user settings, permissions, objects, and the like. While endpoint systems may be suitable for simulating the shared virtual environment for presentation, the intermittent connectivity of endpoint systems makes them unsuitable for managing this type of information. Accordingly, the environment information server 308 may manage and distribute such information.

In the illustrated embodiment, the environment information system 308 includes a user data engine 452, an object data engine 454, an optional third-party data engine 456, a user data store 458, and an object data store 460.

In some embodiments, the user data engine 452 is configured to manage user data within the user data store 458. Some non-limiting examples of user data include unique user identifiers, login and password information, contact information, avatar customization information, preferences, and billing information. The user data may be manipulated through interfaces in the shared virtual environment itself, or through an additional user interface (such as a web-based interface) provided by the environment information server 308.

In some embodiments, the object data engine 454 is configured to manage object data within the object data store 460. The object data may include, but is not limited to, a unique identifier of the object (or an object type); a model representing shape, mass, texture, density, and other physical attributes of the object (or object type); a default location for the object; an owner of the object; and one or more scripts defining behavior of the object.

In some embodiments, the third-party data engine 456 is configured to interact with one or more third-party data sources 312. As some non-limiting examples, the third-party data engine 456 may exchange information with a social network service to allow users within the shared virtual environment to communicate via the social network, to retrieve or upload media or other social postings, and/or for federated authentication. In some embodiments, the third-party data engine 456 may connect with a billing service in order to charge users for access to features within the shared virtual environment. In some embodiments, the third-party data engine 456 may communicate with a third-party content provider to determine whether a given user has access to particular content within the shared virtual environment, or to retrieve such content as requested by the user.

Figure 5:
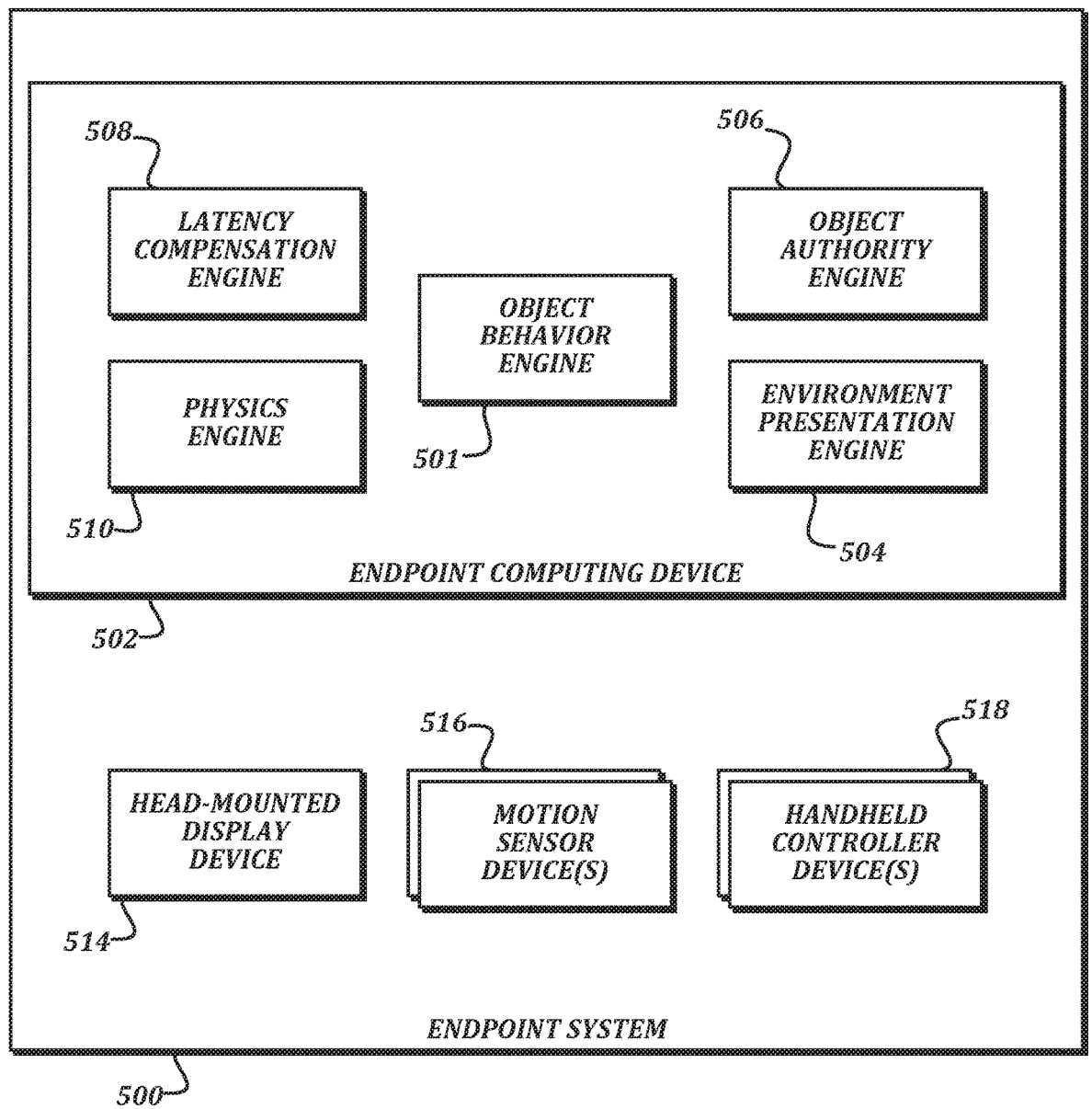
FIG. 5 is a block diagram that illustrates an example embodiment of an endpoint system according to various aspects of the present disclosure.

FIG. 5 is a block diagram that illustrates an example embodiment of an endpoint system according to various aspects of the present disclosure. In the illustrated embodiment, the endpoint system 500 includes an endpoint computing device 502, a head-mounted display device 514, one or more motion sensor devices 516, and one or more handheld controller devices 518.

In some embodiments, the endpoint computing device 502 may be a desktop computing device, a laptop computing device, a tablet computing device, a mobile computing device, or any other type of computing device capable of executing the functionality described herein. The endpoint computing device 502 may have a significant amount of computing and graphic presentation power in order to be able to both execute all of the engines and drive the presentation on the head-mounted display device 514 at a consistently high frame rate. To provide this power, the endpoint computing device 502 may have specialized processors, such as a dedicated graphics card, a physics processing unit, and/or the like.

In some embodiments, the head-mounted display device 514 includes one or more screens, and is configured to be worn on a user's head such that an immersive view of the screens is provided. The head-mounted display device 514 may also include one or more speakers (such as headphones or the like) to provide an audio presentation as well as the video presentation provided by the one or more screens. In some embodiments, the handheld controller devices 518 include one or more input devices such as buttons, trackpads, directional pads, analog sticks, capacitive sensors, and the like. In some embodiments, one of the input devices of the handheld controller devices 518 may be a trigger button. In some embodiments, the handheld controller devices 518 may detect finger states or positions without requiring buttons to be actuated. In some embodiments that are referred to as virtual reality, the head-mounted display device 514 may be opaque, and the screens are the only thing that the user sees during use. In some embodiments that are referred to as augmented reality, the head-mounted display device 514 may have a translucent or transparent display screen, and may allow the user to see objects in the real world along with the objects in the shared virtual environment.

In some embodiments, the motion sensor devices 516 independently detect motion of one or more of the head-mounted display device 514, the handheld controller devices 518, and the user. The motion sensor devices 516 may use any suitable technology to detect the motion, including but not limited to accelerometers, magnetometers, gyroscopes, infrared lasers, depth cameras, photosensors, and computer vision. In some embodiments, multiple motion sensor devices 516 may be located around a room in which the endpoint system 500 is located in order to detect the motion of the head-mounted display device 514, the handheld controller devices 518, and/or the user. In some embodiments, at least some of the motion sensor devices 516 may be incorporated into other devices (such as an accelerometer, magnetometer, and/or gyroscope integrated within the head-mounted display device 514 or handheld controller devices 518.

In some embodiments, the endpoint computing device 502 may be communicatively coupled to the head-mounted display device 514, the motion sensor devices 516, and the handheld controller devices 518 using any suitable communication technology. For example, for the connections between the endpoint computing device 502 and the head-mounted display device 514 or the motion sensor devices 516, high reliability and bandwidth may be desired, and so a suitable high-bandwidth wired communication technique (such as USB 3.0, Thunderbolt, Ethernet, and/or the like) may be used. As another example, for the connections between the endpoint computing device 502 and the handheld controller devices 518, mobility may be a greater concern than bandwidth, and so a wireless communication technique (such as Bluetooth, WiFi, radio frequency (RF) communication, and/or the like) may be used.

In some embodiments, the endpoint computing device 502 is responsible for generating the presentation of the shared virtual environment to the user, for managing the behavior of objects within the shared virtual environment as presented to the user, and for communicating state updates and other environment information with the virtual environment provider system 300 and other endpoint systems. In the illustrated embodiment, the endpoint computing device 502 is configured to provide a latency compensation engine 508, a physics engine 510, an object authority engine 506, and an environment presentation engine 504 in order to provide this functionality.

In some embodiments, the environment presentation engine 504 generates presentations of objects in the shared virtual environment to the user. In some embodiments, the environment presentation engine 504 may generate at least one video feed that includes the presentation of the objects, and provides the at least one video feed to the head-mounted display device 514 to be displayed. In some embodiments, the environment presentation engine 504 may also generate at least one audio feed to be presented via the head-mounted display device 514.

In some embodiments, the physics engine 510 provides a real-time simulation of physical behavior of the objects in the shared virtual environment. As known to one of ordinary skill in the art, a physics engine 510 may provide the simulation by conducting collision detection/collision response actions, rigid body and/or soft body dynamics, fluid dynamics, and/or other processing to determine how objects would interact within the shared virtual environment. In some embodiments, the physics engine 510 may be implemented in software executing on a CPU of the endpoint computing device 502, in software executing in a hardware-accelerated manner on a graphics processing unit (GPU), in dedicated hardware such as a physics processing unit (PPU), or in any combination thereof. Some nonlimiting examples of physics engines 510 that may be suitable for use with the endpoint system 500 include the PhysX engine by Nvidia, the Havok engine by Microsoft Corporation, and the open source Bullet engine.

In some embodiments, the object behavior engine 501 may determine non-physical behavior of objects within the shared virtual environment. As some non-limiting examples of non-physical behavior, the object behavior engine 501 may determine permissions for interacting with an object, may change object states based on game rules or logic, and may detect meaning embedded in interactions detected by the physics engine 510 and respond accordingly (e.g., providing logic that detects collaborative gestures based on object collisions; determining that a collision between a first object and a second object, such as a Frisbee and a target, indicates that a goal in a game has been achieved, and so on).

As described elsewhere herein, object authority over objects within the shared virtual environment is held by the various endpoint systems. Accordingly, the endpoint system 500 will receive location change notifications from other endpoint systems indicating how objects for which the endpoint system 500 does not have object authority should move. The transmission of these notifications will naturally be delayed by some latency in the network 90. In some embodiments, the latency compensation engine 508 is configured help compensate for this latency so that the presentation of objects by the endpoint system 500 can be substantially synchronized with the presentation of the same objects by other endpoint systems 500. In some embodiments, the latency compensation engine 508 is configured to measure latency between the endpoint system 500 and an endpoint system that transmitted a location change notification. While the physics engine 510 may be used to simulate motion of the object to the location indicated in the location change notification, the latency compensation engine 508 helps determine how stale the transmitted location is, and provides information to the physics engine 510 (or the environment presentation engine 504) to allow the animation of the object motion by the endpoint system 500 to eventually be synchronized with the authoritative object motion at the authoritative endpoint system. The latency compensation engine 508 may also help the endpoint computing device 502 compensate for lost or missed location change notifications. Detailed description of these techniques is provided below.

Because the endpoint system 500 manages object authority for objects within the shared virtual environment, in some embodiments, the object authority engine 506 is provided to do so. In some embodiments, the object authority engine 506 is configured to transmit notifications in order to take over object authority for a given object within the shared virtual environment. In some embodiments, the object authority engine 506 is configured to transmit location change notifications based on the locations generated by the physics engine 510 or the object behavior engine 501 for objects for which the endpoint system 500 has taken over object authority.

As described herein, the engines of the endpoint computing device 502 manage the shared virtual environment using a model-view-controller paradigm. That is, for any given object within the shared virtual environment, a data structure representing a model of the object is maintained by the endpoint computing device 502. The latency compensation engine 508, physics engine 510, object behavior engine 501, and object authority engine 506 make changes to the model of the object and therefore act as controllers. The environment presentation engine 504 generates a presentation based on the model of the object, and therefore acts as a view. In some embodiments, other software design paradigms may be used, and so the functionality described below may be split differently, or may be performed by different engines. In some embodiments, the engines described herein may be combined with each other. In some embodiments, multiple copies of a single engine may be present. In some embodiments, functionality described as originating from a given engine may in other embodiments be performed by a different engine.

In some embodiments, some of the devices illustrated in FIG. 5 may be combined with other devices, or some components may be in different devices than illustrated in FIG. 5. For example, in some embodiments, the physics engine 510 and/or the environment presentation engine 504 may be provided by dedicated devices separate from the endpoint computing device 502, or may be provided by the head-mounted display device 514. In some embodiments, the motion sensor devices 516 may track the hands of the user accurately enough to allow the handheld controller devices 518 to be omitted. The below description will refer to embodiments that use handheld controller devices 518 for the sake of clarity. However, the description should not be seen as limiting the disclosure this embodiment, and should instead be seen as encompassing embodiments wherein the handheld controller devices 518 are missing and corresponding user input is obtained through the motion sensor devices 516 alone.

In some embodiments, commercially available hardware may be used for the head-mounted display device 514, the motion sensor devices 516, and the handheld controller devices 518. Some nonlimiting examples of such hardware include the Rift headset and Touch controllers from Oculus VR, LLC; the HTC Vive headset and SteamVR controllers from HTC and Valve Corporation; and the HoloLens headset from Microsoft Corporation. While these examples are provided, one of ordinary skill in the art will understand that the examples are not intended to be limiting, but that other hardware from other manufacturers may instead be used in some embodiments of the present disclosure.

Figure 6:
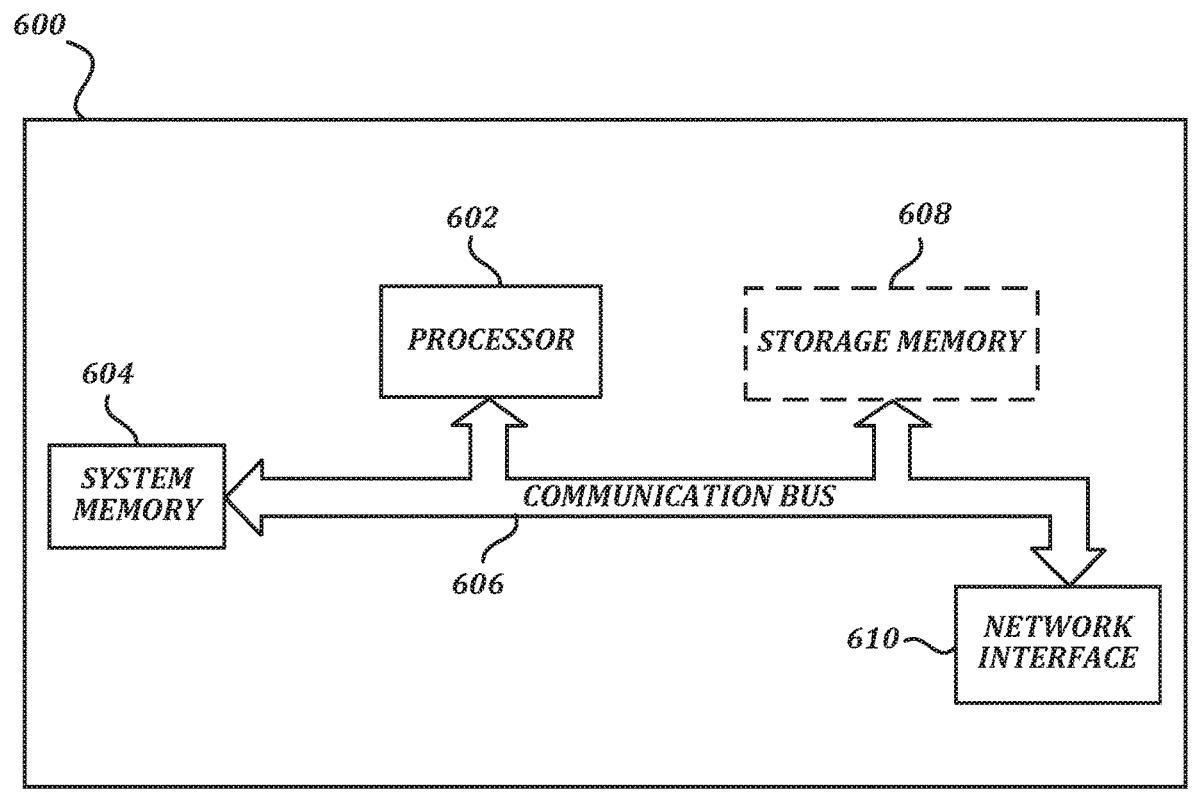
FIG. 6 is a block diagram that illustrates aspects of an exemplary computing device appropriate for use with embodiments of the present disclosure.

FIG. 6 is a block diagram that illustrates aspects of an exemplary computing device appropriate for use with embodiments of the present disclosure. While FIG. 6 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 600 may be any one of any number of currently available or yet to be developed devices.

In its most basic configuration, the computing device 600 includes at least one processor 602 and a system memory 604 connected by a communication bus 606. Depending on the exact configuration and type of device, the system memory 604 may be volatile or nonvolatile memory, such as read only memory ("ROM"), random access memory ("RAM"), EEPROM, flash memory, or similar memory technology. Those of ordinary skill in the art and others will recognize that system memory 604 typically stores data and/or program modules that are immediately accessible to and/or currently being operated on by the processor 602. In this regard, the processor 602 may serve as a computational center of the computing device 600 by supporting the execution of instructions.

As further illustrated in FIG. 6, the computing device 600 may include a network interface 610 comprising one or more components for communicating with other devices over a network. Embodiments of the present disclosure may access basic services that utilize the network interface 610 to perform communications using common network protocols. The network interface 610 may also include a wireless network interface configured to communicate via one or more wireless communication protocols, such as WiFi, 2G, 3G, LTE, WiMAX, Bluetooth, and/or the like.

In the exemplary embodiment depicted in FIG. 6, the computing device 600 also includes a storage medium 608. However, services may be accessed using a computing device that does not include means for persisting data to a local storage medium. Therefore, the storage medium 608 depicted in FIG. 6 is represented with a dashed line to indicate that the storage medium 608 is optional. In any event, the storage medium 608 may be volatile or nonvolatile, removable or nonremovable, implemented using any technology capable of storing information such as, but not limited to, a hard drive, solid state drive, CD-ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer-readable instructions, data structures, program modules, or other data. In this regard, the system memory 604 and storage medium 608 depicted in FIG. 6 are merely examples of computer-readable media.

Suitable implementations of computing devices that include a processor 602, system memory 604, communication bus 606, storage medium 608, and network interface 610 are known and commercially available. For ease of illustration and because it is not important for an understanding of the claimed subject matter, FIG. 6 does not show some of the typical components of many computing devices. In this regard, the computing device 600 may include input devices, such as a keyboard, keypad, mouse, microphone, touch input device, touch screen, tablet, and/or the like. Such input devices may be coupled to the computing device 600 by wired or wireless connections including RF, infrared, serial, parallel, Bluetooth, USB, or other suitable connections protocols using wireless or physical connections. Similarly, the computing device 600 may also include output devices such as a display, speakers, printer, etc. Since these devices are well known in the art, they are not illustrated or described further herein. Unless specifically defined herein, all terms used herein have the same meaning as they would to one skilled in the art of the present disclosure.

Figure 7A:
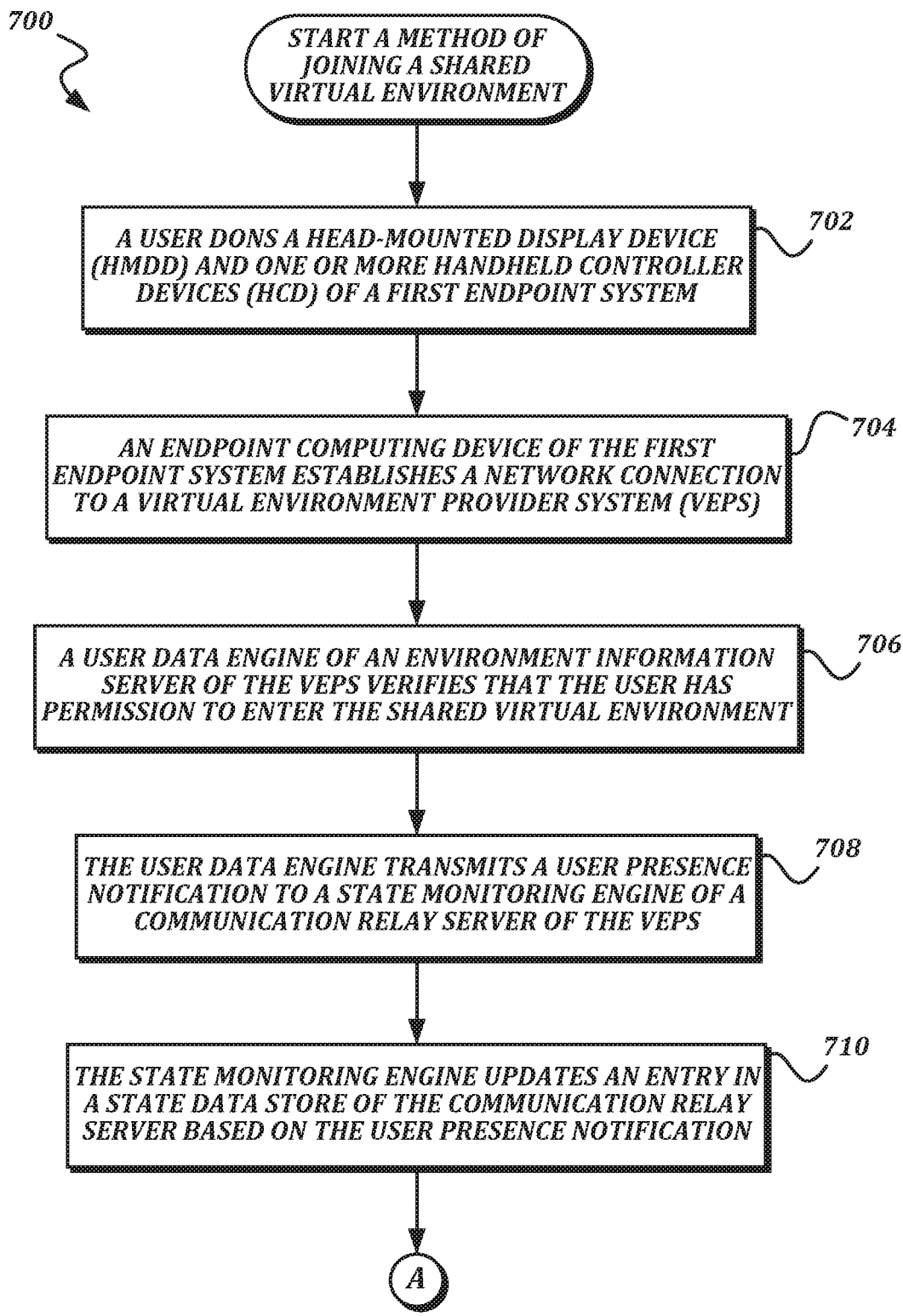
FIGS. 7A-7B are a flowchart that illustrates an example embodiment of a method of joining a shared virtual environment according to various aspects of the present disclosure.
Figure 7B:
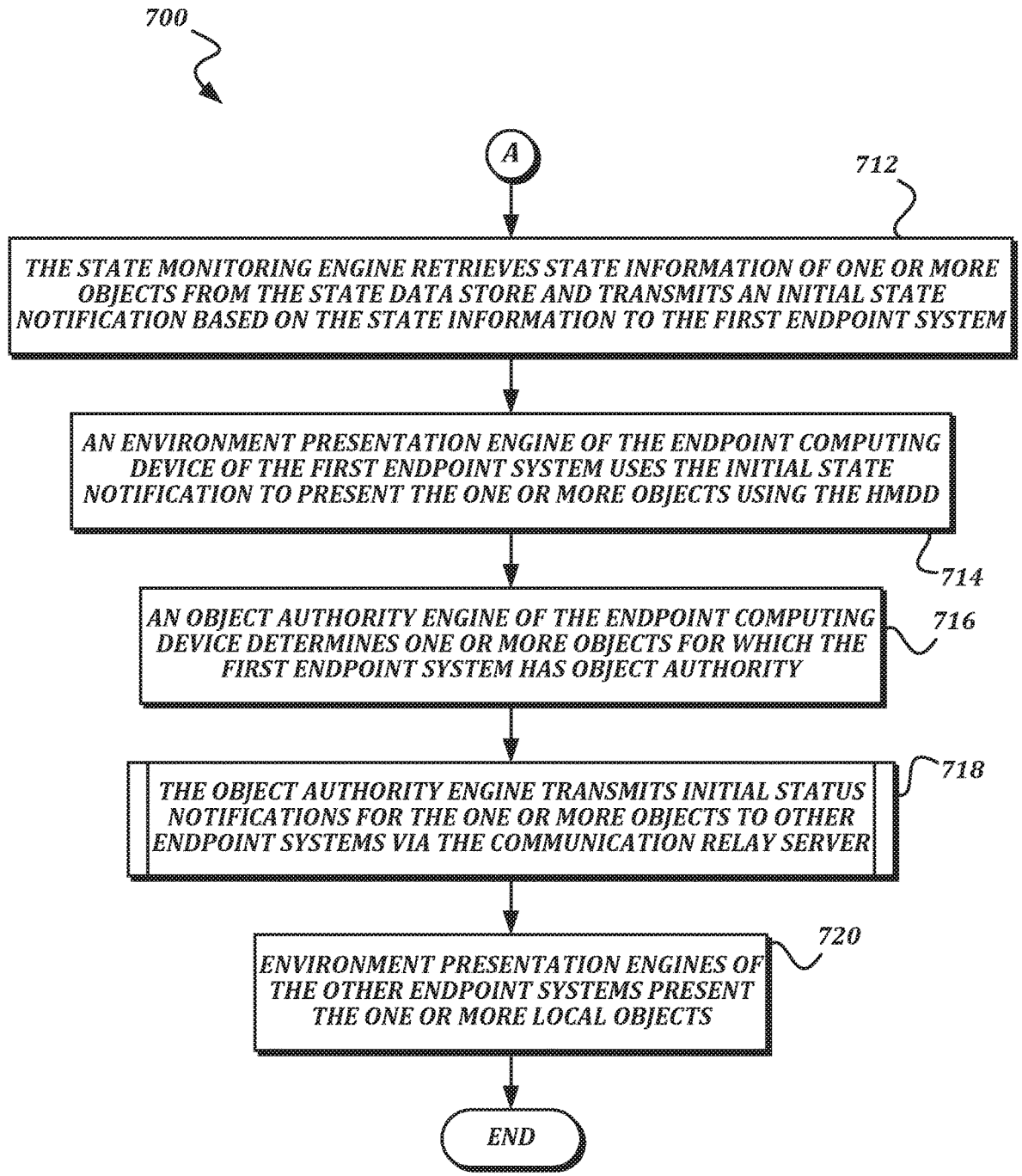

FIGS. 7A-7B are a flowchart that illustrates an example embodiment of a method of joining a shared virtual environment according to various aspects of the present disclosure. From a start block, the method 700 proceeds to block 702, where a user dons a head-mounted display device (HMDD) 514 and one or more handheld controller devices (HCD) 518 of a first endpoint system 302. At block 704, an endpoint computing device 502 of the first endpoint system 302 establishes a network connection to a virtual environment provider system (VEPS) 300. In some embodiments, establishing the network connection to the virtual environment provider system 300 may include a clock synchronization handshake, an exchange of user credentials, an exchange of encryption keys, and/or transmission of other information for establishing the connection. Next, at block 706, a user data engine 452 of an environment information server 308 of the virtual environment provider system 300 verifies that the user has permission to enter the shared virtual environment. In some embodiments, the user data engine 452 may check user credentials submitted in block 704 against an entry in the user data store 458 in order to verify permission. In some embodiments, permission may also be conditioned on aspects of the network connection itself, such as having at least a minimum amount of bandwidth and/or having no more than a maximum allowable latency.

Once permission is verified, the method 700 proceeds to block 708, where the user data engine 452 transmits a user presence notification to a state monitoring engine 406 of a communication relay server 310 of the virtual environment provider system 300. At block 710, the state monitoring engine 406 updates an entry in a state data store 404 of the communication relay server 310 based on the user presence notification. In some embodiments, storing information from the user presence notification in the state data store 404 allows the communication relay server 310 to quickly inform newly connecting endpoint systems 500 about which other endpoint systems 500 are currently participating in the shared virtual environment. The entry may include a network address (such as an IP address and/or the like) by which notifications can be sent to the first endpoint system 302.

The method 700 then proceeds to a continuation terminal ("terminal A"). From terminal A (FIG. 7B), the method 700 proceeds to block 712, where the state monitoring engine 406 retrieves state information of one or more objects from the state data store 404 and transmits an initial state notification based on the state information to the first endpoint system 302. The initial state notification may include the last stored location, velocity, and/or other aspects of the objects. At block 714, an environment presentation engine 504 of the first endpoint system 302 uses the initial state notification to present the one or more objects using the head-mounted display device 514. The initial state notification allows the environment presentation engine 504 of the first endpoint system 302 to know where the objects should be presented within the shared virtual environment. In some embodiments, the initial state notification may include object identifiers for the objects, and the first endpoint system 302 may retrieve models, textures, logic, or other detailed information about the objects from the object data engine 454 of the environment information server 308. In some embodiments, the initial state notification may include the models, textures, logic, or other detailed information about the objects. In some embodiments, the detailed information about the objects may already be present on the first endpoint system 302, and an object identifier in the initial state notification is enough for the first endpoint system 302 to understand how to present the object.

Figure 8:
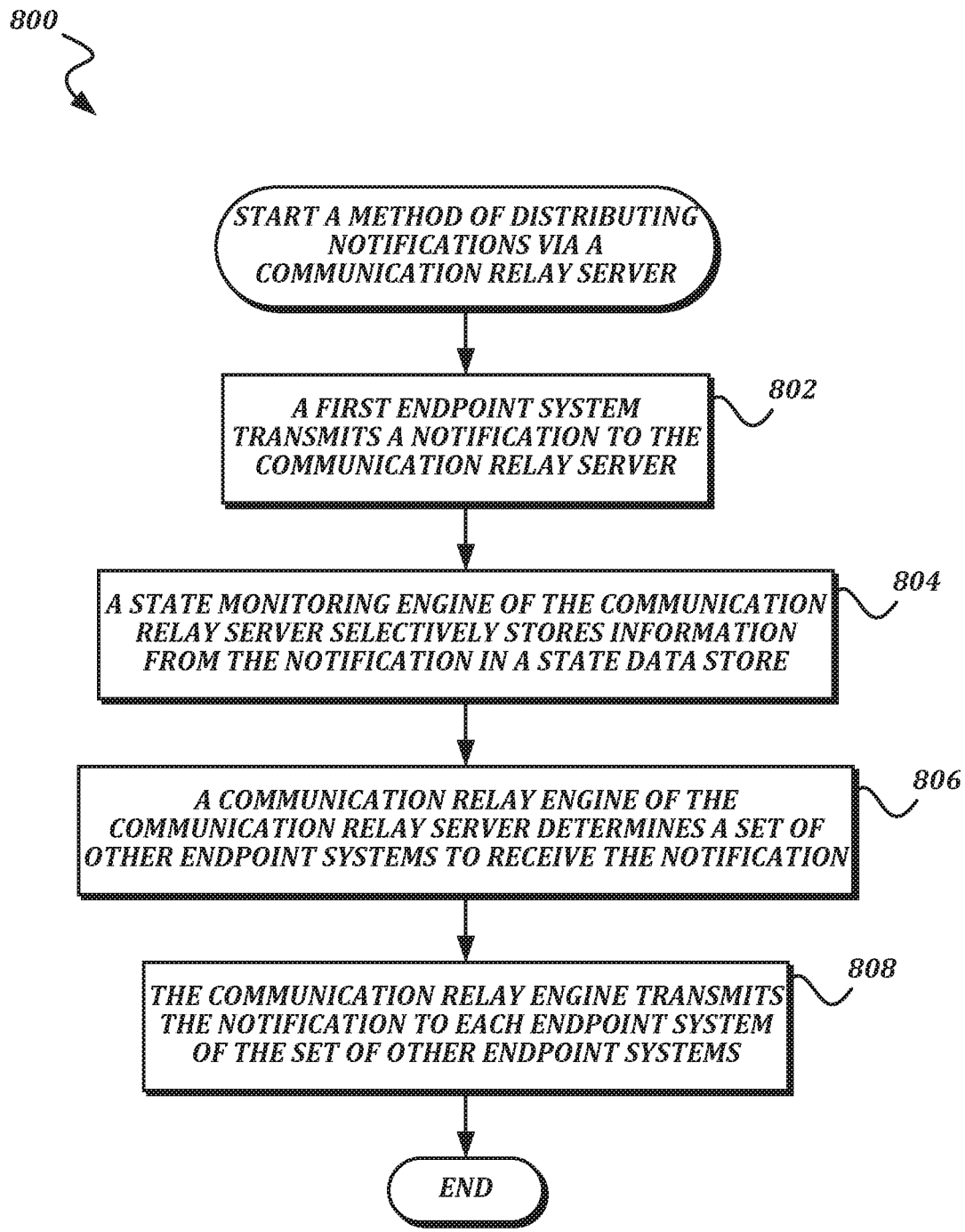
FIG. 8 is a flowchart that illustrates an example embodiment of a method of distributing notifications via a communication relay server according to various aspects of the present disclosure.

At block 716, an object authority engine 506 of the endpoint computing device 502 determines one or more objects for which the first endpoint system 302 has object authority. The objects for which the first endpoint system 302 has object authority include at least objects associated with movement of an avatar associated with the first endpoint system 302. For example, in some embodiments, the first endpoint system 302 may initially have object authority over a head object and two hand objects that are associated with the avatar. In some embodiments, the first endpoint system 302 may also initially have object authority over other objects from the initial state notification that are positioned close to the avatar. The method 700 then proceeds to procedure block 718, where the object authority engine 506 transmits initial status notifications for the one or more objects to other endpoint systems via the communication relay server 310. Any suitable technique for transmitting the notifications via the communication relay server 310 may be used. An example method suitable for use in procedure block 718 is illustrated in FIG. 8 and described in the accompanying text. At block 720, environment presentation engines 504 of the other endpoint systems 500 present the one or more local objects. The presentations on the other endpoint systems 500 use the initial status notifications to determine where to present the objects. The method 700 then proceeds to an end block and terminates. Once the method 700 has concluded, the user of the first endpoint system 302 has entered the shared virtual environment. The first endpoint system 302 will continue to present the shared virtual environment after the method 700 completes.

FIG. 8 is a flowchart that illustrates an example embodiment of a method of distributing notifications via a communication relay server according to various aspects of the present disclosure. As stated above, the method 800 is suitable for use in procedure block 718, as well as in other appropriate procedure blocks throughout the present disclosure. The method 800 may be used to reduce bandwidth requirements, particularly on asymmetric connections at the endpoint systems where upload bandwidth is more limited than download bandwidth.

From a start block, the method 800 proceeds to block 802, where a first endpoint system 302 transmits a notification to the communication relay server 310. Next, at block 804, a state monitoring engine 406 of the communication relay server 310 selectively stores information from the notification in a state data store 404. In some embodiments, the state monitoring engine 406 only stores information from notifications that are not merely ephemeral. For example, the state monitoring engine 406 may not store information from location change notifications, because the information is likely to change very quickly, and the overhead of storing the information in the state data store 404 would not be worth it. However, if the state monitoring engine 406 determines that a location change notification indicates that an object has come to rest (for example, the location information in two or more consecutive location change notifications is identical, or the velocity in a location change notification is zero), the state monitoring engine 406 may store such information in the state data store 404 because it is not likely to change soon. This may also be useful because if a new endpoint system joins the shared virtual environment after the object has come to rest, the new endpoint system would have no other way of knowing the location of the object unless the state monitoring engine stores the location in the state data store 404 and provides it with the initial state notification, because the new endpoint system would not have received any of the past location change notifications. As another example, the state monitoring engine 406 may store other information that is not as ephemeral as location, including but not limited to grab status, game scores, game event notifications, and/or the like.

At block 806, a communication relay engine 402 of the communication relay server 310 determines a set of other endpoint systems to receive the notification. In some embodiments, the communication relay engine 402 may determine which other endpoint systems are participating in the shared virtual environment by checking the entries in the state data store 404, and may use the entries to determine network addresses at which the other endpoint systems can receive communication. Next, at block 808, the communication relay engine 402 transmits the notification to each endpoint system of the set of other endpoint systems. The transmission may use the network addresses that were retrieved from the entry in the state data store 404. The method 800 then proceeds to an end block and terminates.

In the method 800, any suitable transmission technique may be used for the notifications in blocks 802 and 808. In some embodiments, the notifications may be transmitted using a connectionless transmission technique that is appropriate for time-sensitive applications. One suitable technique is the use of user datagram protocol (UDP) packets, though other techniques could be used. The description above of method 800 refers to a "first endpoint system" for clarity. One of ordinary skill in the art will recognize that this method 800 could be used by any endpoint system described herein.

Identifying Collaborative Gestures in a Shared Virtual Environment

Illustrative techniques for identifying collaborative gestures in a shared virtual environment will now be described. Many tasks discussed herein are described as being performed by particular engines, e.g., of an endpoint system. These descriptions are for the purposes of illustration only, and it should be understood that tasks described as being performed by a particular engine (such as an environment presentation engine) may instead be performed by some other engine in accordance with the principles described herein.

Figure 9A:
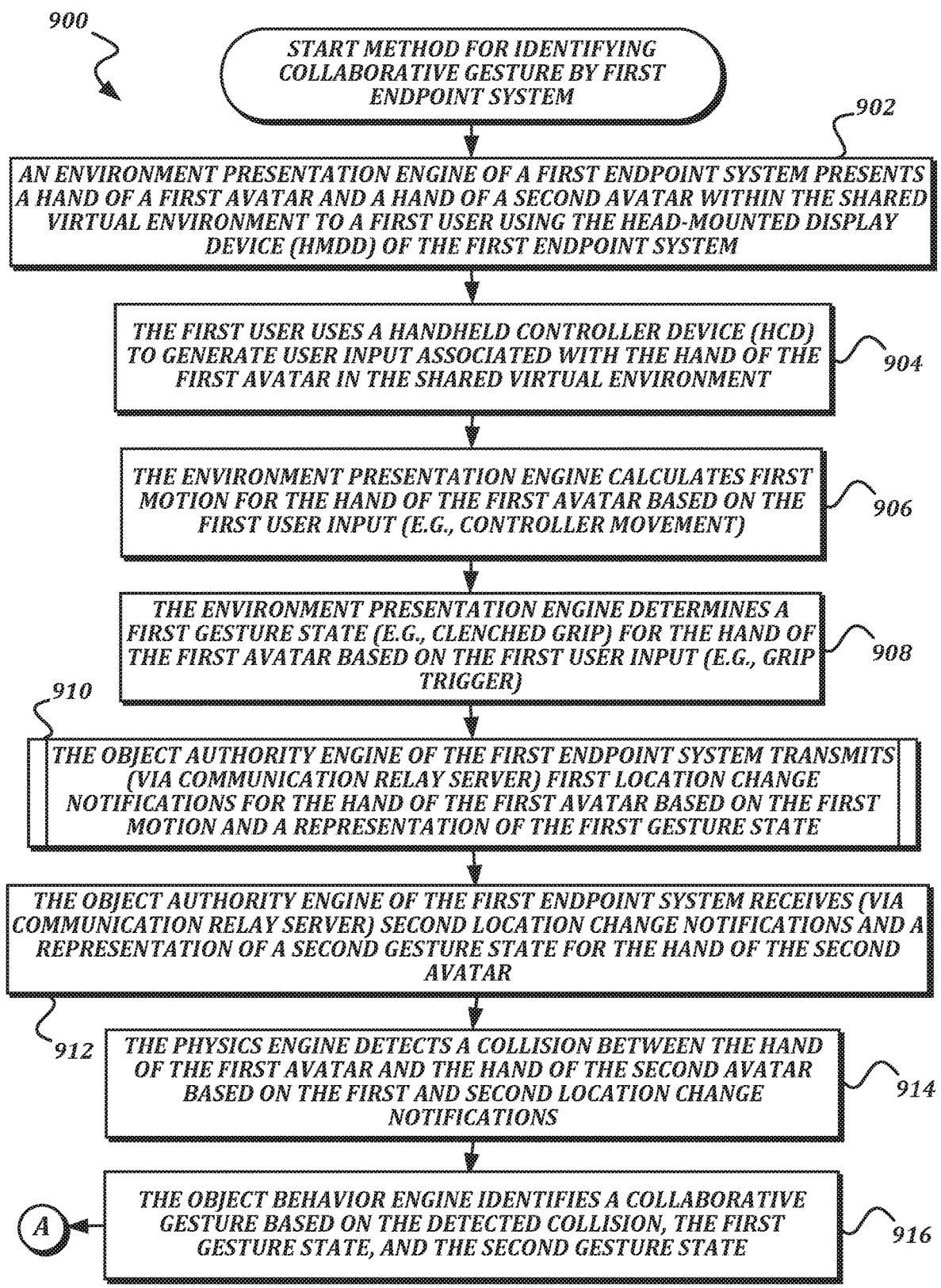
FIGS. 9A-9B are a flowchart that illustrates an example embodiment of a method of identifying a collaborative gesture in a shared virtual environment according to various aspects of the present disclosure.
Figure 9B:
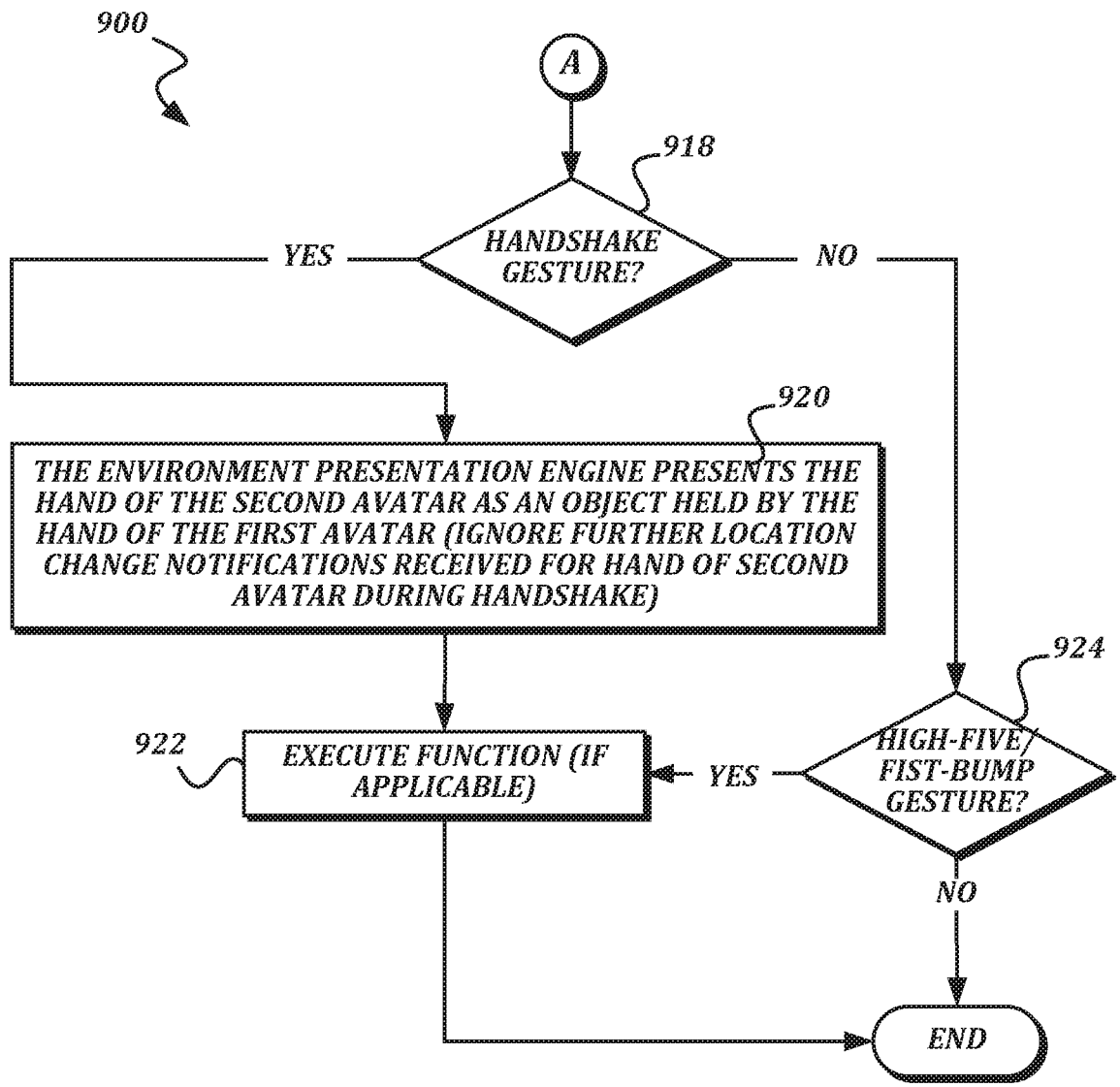

FIGS. 9A-9B are a flowchart that illustrates an example embodiment of a method of identifying a collaborative gesture in a shared virtual environment. Although the flowchart of FIGS. 9A-9B refers to hand-oriented gestures, it should be understood that the collaborative gesture techniques described in this flowchart and elsewhere herein may be easily adapted to accommodate other gestures or gestures involving other objects, such as objects held by avatars.

From a start block, the method 900 proceeds to a procedure block 902, wherein an environment presentation engine of a first endpoint system 302 presents a hand of a first avatar and a hand of a second avatar within the shared virtual environment to a first user, e.g., using the head-mounted display device (HMDD) 514 of the first endpoint system. At block 904, the first user generates user input (e.g., using a handheld controller device (HCD)) associated with the hand of the first avatar in the shared virtual environment. In some embodiments, generating such input may involve using the handheld controller device 518 to move a hand of the avatar of the first user and modify the gesture state (e.g., by causing the avatar hand to close or open).

Next, at procedure block 906, the environment presentation engine calculates first motion for the hand of the first avatar based on at least part of the first user input (e.g., movement of the HCD). At procedure block 908, the environment presentation engine determines a first gesture state (e.g., an open hand or clenched grip, orientation of the arm or hand) for the first avatar based on at least part of the first user input. Calculating the gesture state may involve determining whether a user input device such as a trigger button on the handheld controller device 518 has been actuated. In some embodiments, other techniques for monitoring user hand position (e.g., motion-sensor based monitoring) may be used.

At procedure block 910, an object authority engine 506 of the first endpoint system 302 generates first location change notification(s) for the hand of the first avatar and transmits them (e.g., via the communication relay server 310) along with a representation of the first gesture state to one or more other endpoint systems. The first location change notification(s) are based at least in part on the calculated first motion. In some embodiments, the location change notifications may include information such as an absolute location specified in a coordinate system of the shared virtual environment, a relative location compared to a previous location, a timestamp, and/or the like. The representation of the gesture state may include, one or more data items about the gesture that indicate for example, whether the hand is open or closed. (In any of the examples described herein, if the necessary information about a gesture state can be obtained from some other source, such as location change notifications, a separate representation of the gesture state may not be needed.) At procedure block 912, the object authority engine 506 of the first endpoint system 302 receives (e.g., via the communication relay server 310) second location change notification(s) and a representation of a second gesture state for the hand of the second avatar from a second endpoint system. Any suitable technique for transmitting and receiving the notifications, including but not limited to the method illustrated in FIG. 8, may be used.

Next, at procedure block 914, a physics engine 510 of the first endpoint system 302 detects a collision between the first avatar and the second avatar based at least in part on the first and second location change notifications. For example, in a handshake gesture the physics engine 510 may detect a collision of avatar hands that are initially in an open state, whereas in a fist-bump gesture the physics engine may detect a collision of closed avatar hands. Upon detection of a collision, the objects may be represented as colliding or deforming in some way to provide a more realistic representation.

Figure 10A:
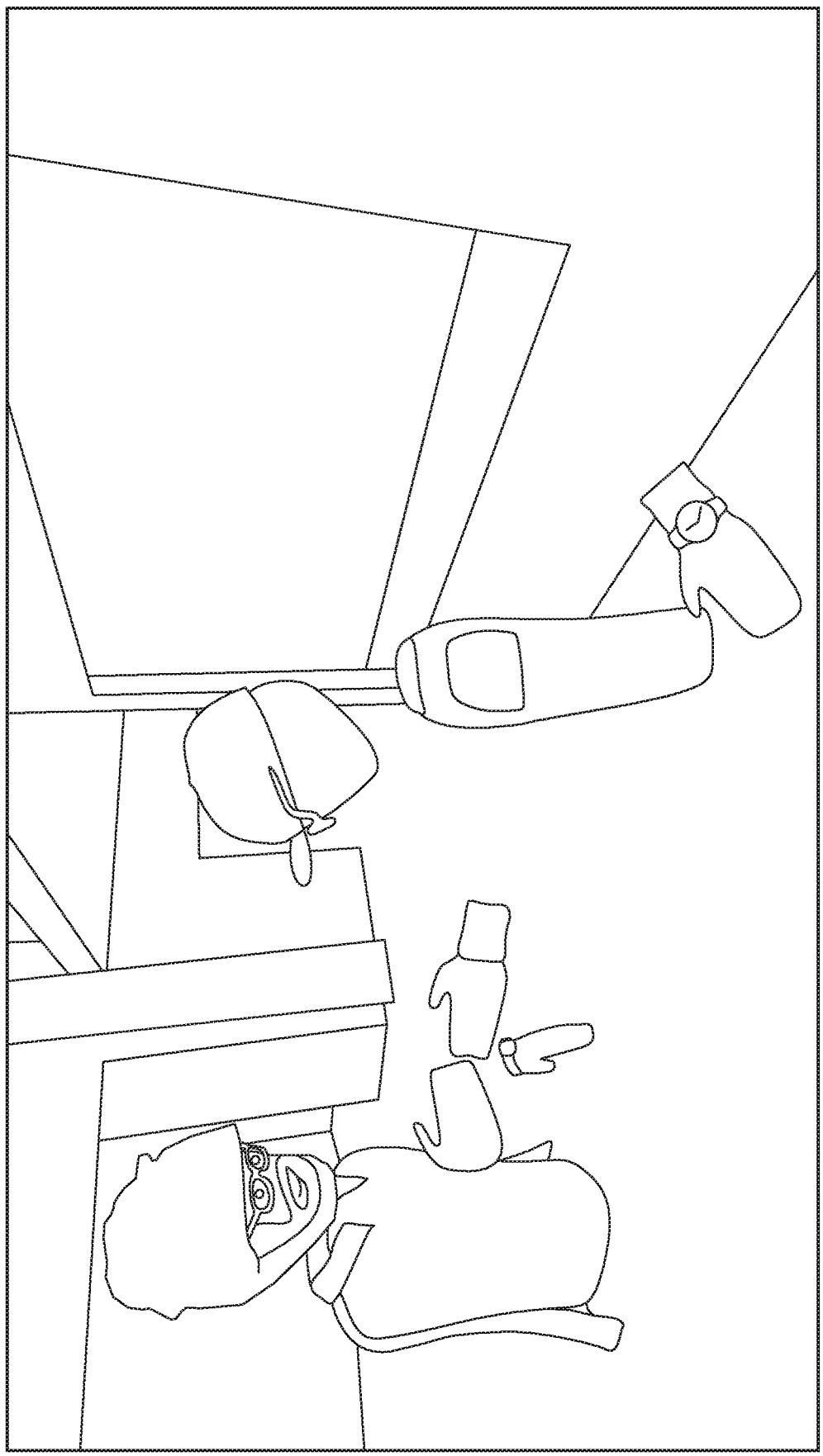
FIGS. 10A-10B are screenshot diagrams that visually depict a collaborative gesture involving collision in a virtual environment according to aspects of the present disclosure.
Figure 10B:
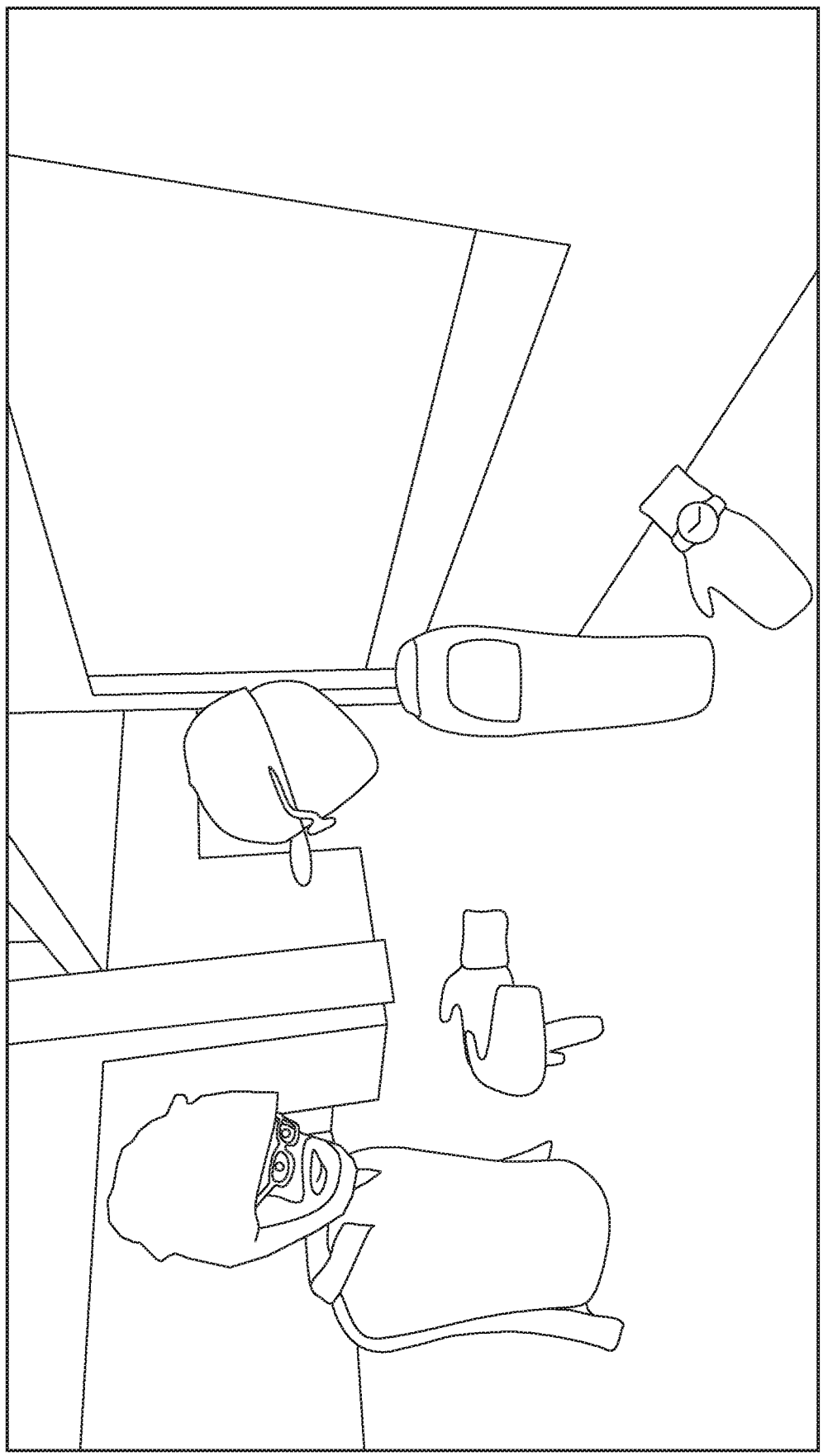

FIGS. 10A-10B are screenshot diagrams that visually depict a collaborative gesture involving collision in a virtual environment. Specifically, FIGS. 10A and 10B visually depict an illustrative handshake gesture prior to and during a collision, respectively, of two avatars' hands. As shown, the avatars' hands are in an open state when the collision occurs.

In general, detecting collisions between objects in a virtual environment involves determining whether the objects intersect with each other within the space of the virtual environment. Collision detection can be implemented in different ways depending on factors such as overall system preferences, bandwidth or processing restrictions, gameplay design, and the like. As one example, accurate models of objects including any irregular features, such as fingers of a hand, may be used in collision detection. This type of collision detection may provide more realistic object interactions, which may be desirable in some scenarios, including complex collaborative gestures such as a handshake involving hooked thumbs. However, detecting collisions of irregular objects is computationally expensive and may make collaborative gestures more difficult for users. For reasons such as these, avatar hands or other objects involved in a gesture may be represented with simplified shapes, such as bounding boxes or spheres, in the physics engine. The particular shape to be used may be selected based on the object being represented. For example, a closed first may be represented with a bounding sphere, whereas an open hand may be represented with a bounding box. Collisions of bounding boxes or spheres may be easier for users to achieve, and detecting such collisions is less computationally expensive than detecting collisions of irregular objects. To make gestures even easier to achieve, the size of the shape may be expanded beyond the size of the original object, such that collisions may be detected even where no part of the objects may be touching each other as represented in the virtual environment.

Referring again to FIG. 9A, at procedure block 916 an object behavior engine 501 of the first endpoint system 302 identifies a collaborative gesture based on the detected collision, the first gesture state, and the second gesture state. The object behavior engine 501 may include a definition for one or more collaborative gestures that can be used to identify such gestures. These definitions may take the form of a series of states of users' avatars.

In the present example, collaborative gestures such as handshakes, high-fives, and first bumps include collisions between users' avatars in the series of states. In a simplified form, a collaborative gesture may be defined by three states that are moved through rapidly based on the geometry of the individual movements, such as the following:
{avatar hands of two users are not colliding};
{hands in a particular gesture state are colliding};
{hands are no longer colliding}.

In such a scenario, the system can distinguish between collaborative gestures based on gesture states. For example, the system can distinguish between a high-five gesture, in which the hands are open when the collision is detected, and some other collaborative gesture, such as a fist-bump, in which the hands are closed when the collision is detected. As another example, a handshake gesture that requires a "grip" action (e.g., in response to actuation of a trigger or button on a control device) may be defined by a more complex set of states, such as the following:
{avatar hands of two users are not colliding};
{hands are colliding, waiting for local grip};
{hands are colliding, local grip active, waiting for remote grip};
{hands are colliding, local and remote "grips" are active for predefined time period}.

In this example, the local grip refers to a grip detected by the user's endpoint system, whereas the remote grip refers to a grip performed by a user of the other endpoint system. The particular order of events (e.g., local grip occurring before remote grip) presented above is illustrative and is not necessarily required for completion of the gesture. The predefined time period over which the grips are active may be useful for avoiding false-positive handshakes, but is not necessarily required. If used, the time period may vary depending on implementation.

It is also possible to impose additional conditions on collaborative gestures, or to replace the conditions above with other conditions. For example, avatars may need to face each other to complete a collaborative gesture. As another example, conditions for a high-five gesture may include palms facing forward and forearms angled upward when the collision occurs, whereas conditions for a fist-bump gesture may include the hands being closed with palms facing down when the collision occurs.

The illustrative collaborative gestures described herein are non-limiting. It will be understood that the particular collaborative gestures to be detected, as well as the criteria for determining whether a particular collaborative gesture has occurred, can be implemented in different ways depending on factors such as overall system preferences, bandwidth or processing restrictions, gameplay design, physics engine design, and the like.

Referring again to FIG. 9A, the method 900 proceeds from procedure block 916 to a continuation terminal ("terminal A"). From terminal A (FIG. 9B), the method 900 advances to a decision block 918, where the first endpoint system 302 determines whether the collaborative gesture is a handshake gesture. If so, the method 900 proceeds with specialized processing for handshake gestures.

At procedure block 920, the environment presentation engine of the first endpoint system 302 presents the hand of the second avatar as an object held by the hand of the first avatar. This may involve the first endpoint system 302 having temporary object authority over the second avatar's hand during the handshake gesture. From this state, further location change notifications received for the hand of the second avatar can be ignored during the handshake. This allows the handshake to appear natural from the perspective of the first user, moving in tandem with the first user's hand for the duration of the handshake, rather than depicting whatever motion the second user may be making with respect to the second avatar's hand. If a handshake is associated with a particular function or gameplay experience, such as a special visual effect or establishment of a relationship between the users, this function can be executed (e.g., by the endpoint systems, a server, or some other device or system) at procedure block 922.

If the collaborative gesture is not a handshake gesture, the method 900 advances to a decision block 924, where a determination is made based as to whether the collaborative gesture is a fist-bump or high-five gesture. If so, the method can proceed to procedure block 922. If the high-five or fist-bump is associated with a particular function or gameplay experience, such as a special visual effect or starting a new game, this function can be executed, and the process ends.

The collaborative gesture may be identified by the second endpoint system and experienced in much the same way by a second user of the second endpoint system. From the perspective of the second endpoint system, an environment presentation engine of the second endpoint system presents the hands of the first and second avatars within the shared virtual environment to the second user. The second user generates user input associated with the hand of the second avatar in the shared virtual environment, as described above. The environment presentation engine of the second endpoint system calculates second motion and determines a second gesture state for the hand of the second avatar based on at least part of the second user input, as described above with respect to the first avatar. The object authority engine 506 of the second endpoint system generates second location change notification(s) and transmits them (e.g., via the communication relay server 310) along with a representation of the second gesture state to one or more other endpoint systems, including the first endpoint system 302. The object authority engine 506 of the second endpoint system also receives (e.g., via the communication relay server 310) the first location change notification(s) and the representation of the first gesture state for the hand of the first avatar from the first endpoint system. A physics engine 510 of the second endpoint system detects a collision between the hand of the first avatar and the hand of the second avatar based at least in part on the first and second location change notifications, as described above. The object behavior engine 501 of the second endpoint system identifies the collaborative gesture based on the detected collision, the first gesture state, and the second gesture state, as described above. Further action can then be taken based on the particular collaborative gesture that is detected, as described above.

Many alternatives to the techniques described above are possible. For example, the scenarios in which described embodiments may be used also may include gestures that do not involve only hands or arms, but involve other parts of an avatar or other objects. As another example, while using collision detection to detect gestures can help ensure that client devices are properly synchronized to a common virtual environment before starting a common experience, using virtual proximity instead of collision detection can help increase the likelihood that the gesture will be successfully detected. Virtual proximity can also make it easier to detect a social gesture performed by more than two users, if collision detection between three or more users is impractical. In some embodiments, a collaborative or social gesture may be detected if multiple users within a given virtual proximity of each other are determined to have performed the same gesture, or corresponding gestures. For example, in a game involving three or more players, gameplay may require a collaborative gesture in which all participating players make a raised hand or raised first gesture above their respective avatar's head. In this situation, rather than detecting collision between all the hands, the system may determine virtual proximity by determining whether all players are in the same virtual room or gaming area when the individual gestures are completed. In response, a new game may be started or some other function may be performed.

Figure 11:
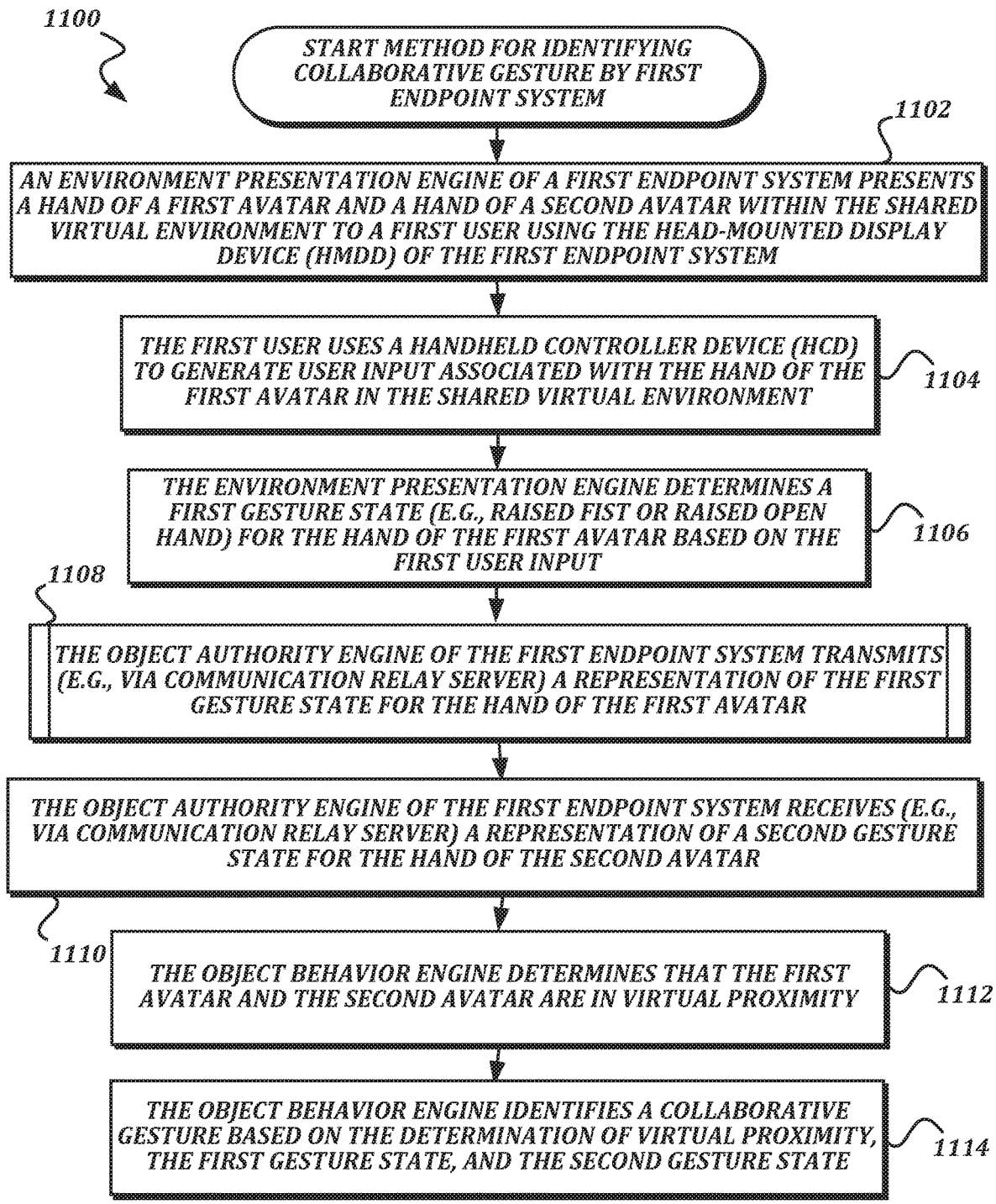
FIG. 11 is a flowchart that illustrates another example embodiment of a method of identifying a collaborative gesture in a shared virtual environment, based on virtual proximity according to aspects of the present disclosure.

FIG. 11 is a flowchart that illustrates another example embodiment of a method of identifying a collaborative gesture in a shared virtual environment, based on virtual proximity. Although the flowchart of FIG. 11 refers to hand-oriented gestures, it should be understood that the collaborative gesture techniques described in this flowchart and elsewhere herein may be easily adapted to accommodate other gestures or gestures involving other objects, such as objects held by avatars, according to principles described herein. In addition, the collaborative gesture techniques described in this flowchart and elsewhere herein may be adapted to accommodate three or more avatars and endpoint systems, according to principles described herein.

From a start block, the method 1100 proceeds to a procedure block 1102, wherein an environment presentation engine of a first endpoint system 302 presents a hand of a first avatar and a hand of a second avatar within the shared virtual environment to a first user, e.g., using the HMDD 514 of the first endpoint system. At block 1104, the first user generates user input (e.g., using an HCD 518) associated with the hand of the first avatar in the shared virtual environment. In some embodiments, generating such input may involve using the HCD 518 to move a hand of the avatar of the first user and potentially modify the gesture state in other ways (e.g., by causing the avatar hand to close or open). Next, at procedure block 1106, the environment presentation engine determines a first gesture state (e.g., an open hand or clenched grip, position or orientation of the arm or hand) for the first avatar based on the first user input.

At procedure block 1108, the object authority engine 506 of the first endpoint system 302 generates a representation of the first gesture state for the first avatar and transmits it (e.g., via the communication relay server 310) to one or more other endpoint systems. At procedure block 1110, the object authority engine 506 of the first endpoint system 302 receives (e.g., via the communication relay server 310) a representation of a second gesture state for the hand of the second avatar from a second endpoint system. Any suitable technique for transmitting and receiving the notifications, including but not limited to the method illustrated in FIG. 8, may be used.

Next, at procedure block 1112, an object behavior engine 501 of the first endpoint system 302 determines that the first avatar and the second avatar are in virtual proximity (e.g., by determining whether the first avatar and the second avatar are in the same virtual room or gaming area). At procedure block 1114, the object behavior engine 501 identifies a collaborative gesture based on the determination of virtual proximity, the first gesture state, and the second gesture state. The object behavior engine 501 may include a definition for one or more collaborative gestures that can be used to identify such gestures. For example, a raised hand or raised first gesture performed by avatars in the same virtual room or gaming area may be defined as a collaborative gesture to start a new game or cause some other function to be performed.

The collaborative gesture may be identified by the second endpoint system and experienced in much the same way by a second user of the second endpoint system. For example, from the perspective of the second endpoint system, an environment presentation engine of the second endpoint system presents the hands of the first and second avatars within the shared virtual environment to the second user. The second user generates user input associated with the hand of the second avatar in the shared virtual environment, as described above. The environment presentation engine of the second endpoint system determines a second gesture state for the second avatar based on at least part of the second user input, as described above with respect to the first avatar. The object authority engine 506 of the second endpoint system generates the representation of the second gesture state for the second avatar and transmits it (e.g., via the communication relay server 310) to one or more other endpoint systems, including the first endpoint system 302, as described above. The object authority engine 506 of the second endpoint system also receives (e.g., via the communication relay server 310) the representation of the first gesture state for the first avatar from the first endpoint system 302. An object behavior engine 501 of the second endpoint system determines that the first avatar and the second avatar are in virtual proximity (e.g., by determining whether the first avatar and the second avatar are in the same virtual room or gaming area), as described above. The object behavior engine 501 identifies a collaborative gesture based on the determination of virtual proximity, the first gesture state, and the second gesture state, as described above. Further action can then be taken based on the particular collaborative gesture that is detected.

While illustrative embodiments have been illustrated and described, it will be appreciated that various changes can be made therein without departing from the spirit and scope of the invention.

The embodiments of the invention in which an exclusive property or privilege is claimed are defined as follows:

1. A system comprising:
    a first endpoint system; and
    a second endpoint system;
    wherein the first endpoint system comprises one or more computing devices programmed to:
        display a shared virtual environment in a view associated with the first endpoint system;
        receive first user input associated with a hand of a first avatar in the shared virtual environment;
        calculate, based on the first user input, first motion for the hand of the first avatar;
        determine, based on the first user input, a first gesture state for the hand of the first avatar;
        transmit first location change notifications and a representation of the first gesture state for the hand of the first avatar;
        receive second location change notifications and a representation of a second gesture state for a hand of a second avatar in the shared virtual environment;
        detect a collision in the shared virtual environment between the hand of the first avatar and the hand of the second avatar based on the first location change notifications and the second location change notifications;
        identify a collaborative gesture based on the detected collision, the first gesture state, and the second gesture state; and
        display the identified collaborative gesture in the view associated with the first endpoint system; and
    wherein the second endpoint system comprises one or more computing devices programmed to:
        display the shared virtual environment in a view associated with the second endpoint system that differs from view associated with the first endpoint system;
        receive second user input associated with the hand of the second avatar in the shared virtual environment;
        calculate, based on the second user input, second motion for the hand of the second avatar;
        determine, based on the second user input, the second gesture state for the hand of the second avatar;
        transmit the second location change notifications for the hand of the first avatar and the representation of the second gesture state;
        receive the first location change notifications and a representation of the first gesture state for the hand of the first avatar;
        detect a collision in the shared virtual environment between the hand of the first avatar and the hand of the second avatar based on the first location change notifications and the second location change notifications;
        identify a collaborative gesture based on the detected collision, the first gesture state, and the second gesture state; and
        display the identified collaborative gesture in the view associated with the second endpoint system.

2. The system of claim 1, wherein the collaborative gesture comprises a handshake gesture.

3. The system of claim 2, wherein the first endpoint system is further configured to present the hand of the second avatar as an object held by the hand of the first avatar, and wherein the second endpoint system is further configured to present the hand of the first avatar as an object held by the hand of the second avatar.

4. The system of claim 3, wherein further location change notifications received by the first endpoint system for the hand of the second avatar are ignored during the handshake gesture, and wherein further location change notifications received by the second endpoint system for the hand of the first avatar are ignored during the handshake gesture.

5. The system of claim 1, wherein the collaborative gesture comprises a closed-fist gesture or a high-five gesture.

6. The system of claim 1, wherein identification of the collaborative gesture is further based on detecting that the first avatar and the second avatar are facing each other in the shared virtual environment.

7. The system of claim 1, wherein the first endpoint system or the second endpoint system is further configured to cause execution of a function in response to identification of the collaborative gesture.

8. The system of claim 7, wherein the function comprises starting a game or establishing a relationship between a user associated with the first avatar and a user associated with the second avatar.

9. A computer-implemented method comprising:
by a first endpoint system:
displaying a shared virtual environment in a view associated with the first endpoint system;
receiving first user input associated with a hand of a first avatar in the shared virtual environment;
calculating, based on the first user input, first motion for the hand of the first avatar;
determining, based on the first user input, a first gesture state for the hand of the first avatar;
receiving location change notifications and a representation of a second gesture state for a hand of a second avatar controlled by a second endpoint system;
detecting a collision in the shared virtual environment between the hand of the first avatar and the hand of the second avatar based on the first motion and the second location change notifications;
identifying a collaborative gesture based on the detected collision, the first gesture state, and the second gesture state; and
displaying the identified collaborative gesture in the view associated with the first endpoint system.

10. The method of claim 9, wherein the collaborative gesture comprises a handshake gesture.

11. The method of claim 10, wherein the first gesture state and the second gesture state each indicate a clenched grip for a threshold period of time.

12. The method of claim 10, wherein the first endpoint system is further configured to present the hand of the second avatar as an object held by the hand of the first avatar.

13. The method of claim 10, wherein the first endpoint system has temporary object authority over the second avatar's hand during the collaborative gesture.

14. The method of claim 9, wherein the collaborative gesture comprises a closed-fist gesture or a high-five gesture.

15. The method of claim 9, wherein identifying the collaborative gesture is further based on detecting that the first avatar and the second avatar are facing each other in the shared virtual environment.

16. The method of claim 9 further comprising causing execution of a function in response to identifying the collaborative gesture.

17. The method of claim 9 further comprising transmitting first location change notifications for the hand of the first avatar and a representation of the first gesture state.

18. The method of claim 17, further comprising:
by the second endpoint system:
receiving second user input associated with the hand of the second avatar in the shared virtual environment;
calculating, based on the second user input, second motion for the hand of the second avatar;
determining, based on the second user input, a second gesture state for the hand of the second avatar;
transmitting the second location change notifications for the hand of the second avatar and the representation of the second gesture state;
receiving the first location change notifications for the hand of the first avatar and the representation of the first gesture state;
detecting a collision between the hand of the first avatar and the hand of the second avatar based on the first location change notifications and the second location change notifications; and
identifying a collaborative gesture based on the detected collision, the first gesture state, and the second gesture state.

19. A non-transitory computer-readable storage medium having stored thereon instructions configured to cause a computer system to perform steps comprising:
by a first endpoint system:
displaying a shared virtual environment in a view associated with the first endpoint system;
receiving a first user input associated with a hand of a first avatar in the shared virtual environment;
calculating, based on the first user input, first motion for the hand of the first avatar;
determining, based on the first user input, a first gesture state for the hand of the first avatar;
transmitting first location change notifications and a representation of the first gesture state for the hand of the first avatar;
receiving second location change notifications and a representation of a second gesture state for a hand of a second avatar in the shared virtual environment;
detecting a collision in the shared virtual environment between the hand of the first avatar and the hand of the second avatar based on the first motion and the second location change notifications;
identifying a collaborative gesture based on the detected collision, the first gesture state, and the second gesture state; and
displaying the identified collaborative gesture in the view associated with the first endpoint system.

20. The non-transitory computer-readable storage medium of claim 19 having stored thereon instructions configured to cause the computer system to perform steps further comprising:
by a second endpoint system:
receiving second user input associated with the hand of the second avatar in the shared virtual environment;
calculating, based on the second user input, second motion for the hand of the second avatar;
determining, based on the second user input, the second gesture state for the hand of the second avatar;
transmitting the second location change notifications for the hand of the second avatar and the representation of the second gesture state;
receiving the first location change notifications and the representation of the first gesture state for the hand of the first avatar;
detecting the collision in the shared virtual environment between the hand of the first avatar and the hand of the second avatar based on the first location change notifications and the second motion; and
identifying the collaborative gesture based on the detected collision, the first gesture state, and the second gesture state.

\* \* \* \* \*